United States Patent
Chang et al.

(10) Patent No.: US 9,302,218 B2
(45) Date of Patent: Apr. 5, 2016

(54) CHEMICALLY-ENHANCED SORBENT ACTIVATION PROCESS AND METHODS FOR USING SAME

(75) Inventors: Ramsay Chang, Mountain View, CA (US); Yongqi Lu, Urbana, IL (US); Massoud Rostam-Abadi, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 461 days.

(21) Appl. No.: 13/589,720

(22) Filed: Aug. 20, 2012

(65) Prior Publication Data

US 2013/0095019 A1 Apr. 18, 2013

Related U.S. Application Data

(63) Continuation-in-part of application No. 12/851,507, filed on Aug. 5, 2010, which is a continuation-in-part of application No. 12/722,497, filed on Mar. 11, 2010, now Pat. No. 8,999,278.

(51) Int. Cl.

| | |
|---|---|
| *B01D 53/62* | (2006.01) |
| *B01D 53/72* | (2006.01) |
| *B01J 20/20* | (2006.01) |
| *B01D 53/02* | (2006.01) |
| *B01J 20/30* | (2006.01) |
| *B01D 53/64* | (2006.01) |
| *B01J 20/02* | (2006.01) |
| *B03C 3/017* | (2006.01) |
| *B03C 3/16* | (2006.01) |
| *B01J 20/04* | (2006.01) |

(52) U.S. Cl.
CPC .............. *B01D 53/62* (2013.01); *B01D 53/025* (2013.01); *B01D 53/64* (2013.01); *B01D 53/72* (2013.01); *B01J 20/027* (2013.01); *B01J 20/0229* (2013.01); *B01J 20/0288* (2013.01); *B01J 20/046* (2013.01); *B01J 20/20* (2013.01); *B01J 20/3085* (2013.01); *B03C 3/017* (2013.01); *B03C 3/16* (2013.01); *B01D 2251/108* (2013.01); *B01D 2251/404* (2013.01); *B01D 2253/102* (2013.01); *B01D 2253/25* (2013.01); *B01D 2255/00* (2013.01); *B01D 2257/502* (2013.01); *B01D 2257/602* (2013.01); *B01D 2257/708* (2013.01); *B01D 2258/0283* (2013.01); *B01J 2220/56* (2013.01)

(58) Field of Classification Search
CPC ....................................................... B01D 53/62
See application file for complete search history.

(56) References Cited

U.S. PATENT DOCUMENTS 7,704,921 B2 * 4/2010 Bool et al. ..................... 502/417

* cited by examiner

*Primary Examiner* — Stuart Hendrickson
(74) *Attorney, Agent, or Firm* — Owens Tarabichi LLP

(57) ABSTRACT

The invention is directed to methods and equipment for generating an activated sorbent from a sorbent precursor with the addition of certain chemicals that enhance the effectiveness of the activated sorbent. The invention is also directed to the methods and equipment for generating some of the chemicals that are added to the raw carbonaceous material or activated sorbent to enhance its effectiveness. The invention is also directed to methods and equipment for generating certain chemicals that can be added to a gas stream to convert a given gaseous pollutant to a form that is more easily removed from the gas stream. The invention is also directed to methods and equipment for adding an activated sorbent and various chemicals for a gas stream having one or more gaseous pollutants.

28 Claims, 11 Drawing Sheets

CHEMICALLY-ENHANCED SORBENT ACTIVATION PROCESS AND METHODS FOR USING SAME

CROSS-REFERENCE TO RELATED APPLICATION

This application is a continuation-in-part of prior U.S. patent application Ser. No. 12/851,507, filed Aug. 5, 2010, which is a continuation-in-part of prior U.S. patent application Ser. No. 12/722,497, filed Mar. 11, 2010 now U.S. Pat. No. 8,999,278, each of which are incorporated by reference herein in their entireties.

BACKGROUND

1. Background of the Invention

The invention relates generally to the production of an activated sorbent for use in the removal of gaseous pollutants from a gas stream. More particularly, the invention relates to methods and equipment for the on-site production of an activated sorbent, and in some embodiments, the invention relates to methods and equipment for the on-site production of an activated sorbent with the addition of certain chemicals that enhance the activity or effectiveness of the activated sorbent to produce a chemically-enhanced activated sorbent. Further, the invention relates to methods and equipment for further processing and use of the chemically-enhanced activated sorbent in the removal of gaseous pollutants from a gas stream. The invention also relates to methods and equipment for the addition of certain chemicals that convert certain gaseous pollutants in a gas stream to a form that is more easily removed from the gas stream, for example, by a sorbent, including a chemically-enhanced activated sorbent.

2. Description of Related Art

Controlling emissions of certain gaseous pollutants, such acid gases and air toxics, in flue gases generated from combustion devices, such as coal-fired power plants, is an important concern. In such flue gases, certain air toxics and other species can be distributed in both the vapor phase and the solid phase, thereby requiring removal of both solid matter, such as particulate matter, as well as vapor phase species. Further, certain air toxics (e.g., mercury), certain acid gases (e.g., $SO_3$, HCl), and other air toxics (e.g., arsenic, selenium, nickel, lead, organics, etc.) that are present in the vapor phase of such flue gases are typically found in very low concentrations making removal difficult.

Sorbents are sometimes used to remove certain pollutants from gas streams. For example, sorbents may be injected into a gas stream and collected downstream after adsorbing a targeted vapor phase contaminant. Alternatively, a packed bed, an entrained bed, or a fluidized bed may used with a sorbent to adsorb a given vapor phase pollutant from a gas stream.

Calcium-based sorbents such as limestone, dolomite, lime, hydrated lime, calcium acetate, and calcium magnesium acetate are used, for example, in the removal of sulfur-based vaporous pollutants, such as $SO_2$ and $SO_3$ from coal-fired power plant flue gases. These sorbents can also be effective in removing other acid gases, such as HCl and $H_2S$, as well as vaporous air toxic species, including metal compounds such as selenium, arsenic, nickel, lead, and others found in trace amounts in coal-fired power plant flue gases. However, the process by which hydrated lime or lime, in particular, is produced is energy intensive, making these sorbents relatively expensive.

Activated carbon is a sorbent used for sorption of mercury species from coal combustion flue gases and other industrial gas streams. The results from pilot and full-scale field demonstration tests have revealed that at a carbon loading of less than 5 lb/MMft$^3$, mercury removal greater than 90% is achievable for flue gases generated from burning low-sulfur coals. However, mercury removal efficiency for flue gases generated from burning high-sulfur coals, which commonly contain greater than 10 ppm $SO_3$, a level significantly higher than that in flue gases generated from lower sulfur coals, have been reported to be less than 50% at comparable activated carbon loadings.

In view of the foregoing, there is a need for an improved, low-cost method for generating a sorbent for use in removing certain gaseous pollutants from gas streams. Further, there is a need for generating a sorbent that has sufficient activity or effectiveness in adsorbing such gaseous pollutants.

SUMMARY OF THE INVENTION

Generally, the invention in its various embodiments is directed to methods and equipment for removing a gaseous pollutant from a gas stream. More particularly, the invention in its various embodiments is directed to methods and equipment for generating an activated sorbent from a sorbent precursor, and in some embodiments, the invention relates to methods and equipment for the on-site production of an activated sorbent with the addition of certain chemicals that enhance the effectiveness of the activated sorbent. The activated sorbent having enhanced effectiveness can then be added to a gas stream to adsorb or remove one or more gaseous pollutants. The invention in its various embodiments is also directed to methods and equipment for generating some of the chemicals that are added to a raw carbonaceous material that is used to produce an activated sorbent or to the activated sorbent itself to enhance its effectiveness. The invention in its various embodiments is also directed to methods and equipment for generating certain chemicals that can be added to a gas stream to convert a given gaseous pollutant to a form that is more easily removed from the gas stream, for example, by using an activated sorbent, including commercially available sorbents, sorbents produced on-site, and sorbents produced according to the methods described herein such as activated sorbents produced with the addition of certain chemicals that enhance the activated sorbent's effectiveness.

In one embodiment, the invention provides a method for generating a sorbent, comprising activating a sorbent precursor in the presence of a chemical to produce a chemically-enhanced activated sorbent that provides increased adsorption of a gaseous pollutant than the same activated sorbent produced in the absence of the chemical.

In another embodiment, the invention provides a method for removing a gaseous pollutant, comprising activating a sorbent precursor in the presence of a chemical to produce a chemically-enhanced activated sorbent that provides increased adsorption of a gaseous pollutant than the same activated sorbent produced in the absence of the chemical; adding the chemically-enhanced activated sorbent to a gas stream comprising at least one gaseous pollutant; adsorbing the at least one gaseous pollutant with the chemically-enhanced activated sorbent; and removing the activated sorbent and the adsorbed gaseous pollutant from the gas stream.

In another embodiment, the invention provides a method for removing a gaseous pollutant, comprising adding a chemical to a gas stream comprising at least one gaseous pollutant; converting the at least one gaseous pollutant to a converted form that is more easily removed from the gas stream compared to the at least one gaseous pollutant's original form; adsorbing the converted form of the at least one gaseous pollutant with a sorbent; and removing the sorbent and the converted form of at least one gaseous pollutant from the gas stream or absorbing the converted form of the at least one gaseous pollutant in a wet scrubber.

In another embodiment, the invention provides a method for adding an activated sorbent, including, for example, a chemically-enhanced activated sorbent, to a gas stream comprising at least one gaseous pollutant, comprising separating a first gas stream comprising an activated sorbent into a stream of the activated sorbent and a separated gas stream, wherein the first gas stream comprises a gas stream used to activate a sorbent precursor to produce the activated sorbent; and adding the activated sorbent from the stream of the activated sorbent to a second gas stream comprising at least one gaseous pollutant, wherein the activated sorbent is capable of adsorbing the at least one gaseous pollutant.

In another embodiment, the invention provides a method for adding an activated sorbent to a gas stream comprising at least one gaseous pollutant, comprising adding a first portion of a first gas stream comprising an activated sorbent to a gas stream comprising at least one gaseous pollutant, wherein the first gas stream comprises an activating gas stream used to activate a sorbent precursor to produce the activated sorbent, including a chemically-enhanced activated sorbent, and wherein the activated sorbent is capable of adsorbing said at least one gaseous pollutant; separating a second portion of the first gas stream comprising the activated sorbent into a stream of the activated sorbent and a separated gas stream; and adding the activated sorbent from the stream of the activated sorbent to the gas stream comprising the at least one gaseous pollutant.

DETAILED DESCRIPTION OF THE INVENTION

Figure 1:
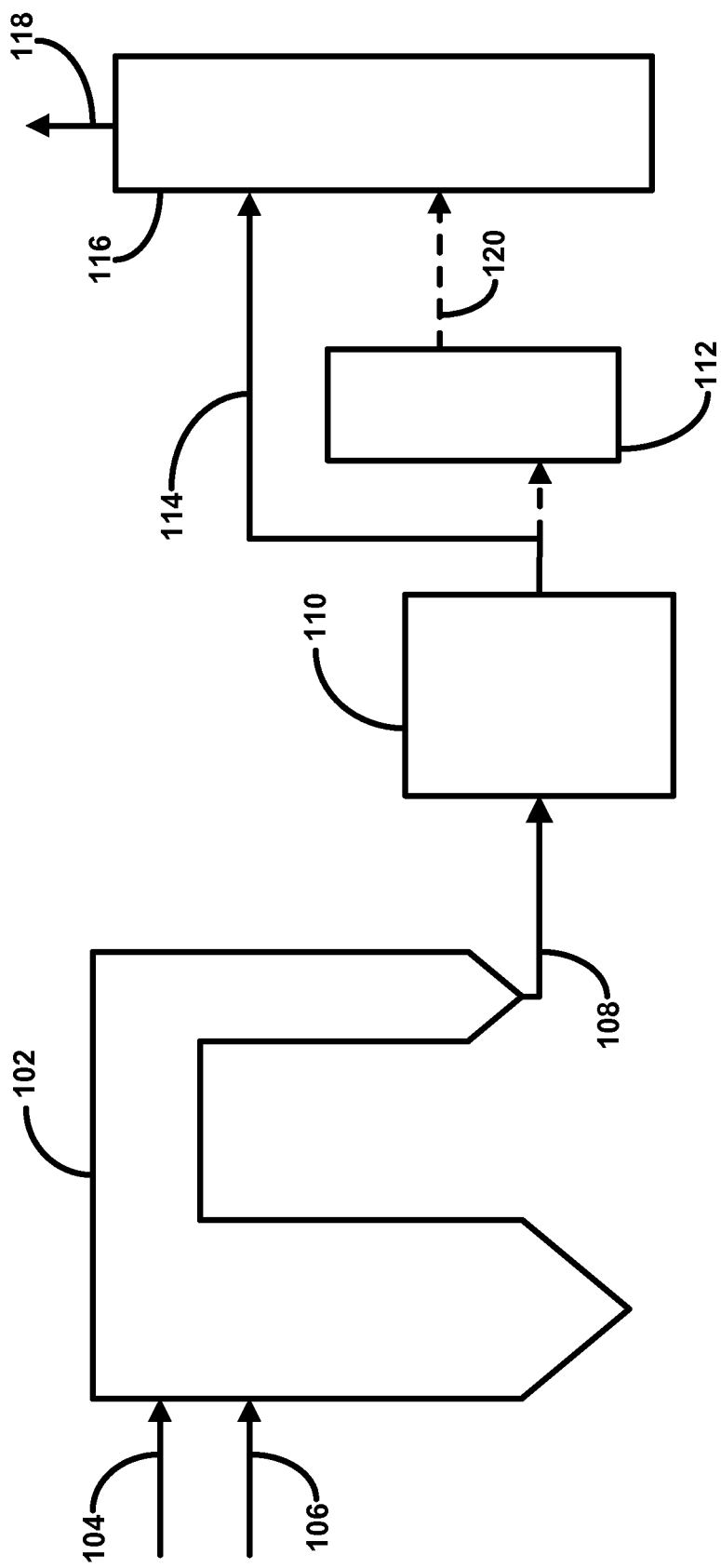
FIG. 1 illustrates a combustion device and a pollution removal system in which various embodiments of the present invention may be utilized.

Generally, the following description is directed to methods and equipment for removing a gaseous pollutant from a gas stream. More particularly, the following description is directed to methods and equipment for generating an activated sorbent from a sorbent precursor and, more specifically, to methods and equipment for the on-site production of the activated sorbent with the addition of certain chemicals that enhance the effectiveness of the activated sorbent. The description is also directed to methods and equipment for further processing of the chemically-enhanced activated sorbent in preparation for its use and to methods and equipment for its use in removing gaseous pollutants from a gas stream.

In particular, the following description is directed to methods and equipment for the generation of an activated sorbent from a sorbent precursor such as a raw carbonaceous starting material. For example, in one embodiment, the following description is directed to methods and equipment for the generation of an activated carbon from a raw carbonaceous starting material with the addition of certain chemicals, such as bromine or other transition and noble metals, that enhance the effectiveness of the activated carbon. This activated carbon can be added, for example, to a flue gas stream from a coal-fired boiler for the adsorption or removal of vaporous mercury from the flue gas stream, where this particular activated carbon will more effectively adsorb mercury in the flue gas stream compared to activated carbon produced without the addition of certain chemicals. The following description is also directed to the methods and equipment for generating some of the chemicals that are added to the raw carbonaceous material or activated sorbent to enhance its effectiveness.

The following description is also directed to methods and equipment for generating certain chemicals that can be added to a gas stream to convert a given gaseous pollutant to a form that is more easily removed from the gas stream, for example, by using an activated sorbent. For example, in one embodiment, the following description is directed to methods and equipment for generating certain ions and gases that can be added to a gas stream to assist in the removal of certain gaseous pollutants. These ions and gases react with one or more vapor phase contaminants to alter their chemical composition to a form that allows them to be more easily removed from the gas stream. For example, a high temperature reactor can be used to decompose bromine compounds into bromine ions and gases, such as bromine gas, elemental bromine, or hydrogen bromide. Since such ions and gases may be corrosive inside a boiler, but in some embodiments, these ions and gases can be advantageously added to the flue gas stream downstream of the boiler. For example, these ions and gases can be added to a flue gas stream from a coal-fired boiler that contains elemental mercury to oxidize the elemental mercury to an oxidized form of mercury. The oxidized form of mercury can then be more easily removed from the gas stream, for example, through absorption in a wet $SO_x$ scrubber or with the use of an activated sorbent, including, for example, commercially available sorbents, sorbents produced on-site, and sorbents produced according to the methods described herein such as activated sorbents produced with the addition of certain chemicals that enhance the activated sorbent's effectiveness.

The following description is also directed to methods and equipment for further processing of an activated sorbent, including a chemically-enhanced activated sorbent or activated sorbent having enhanced effectiveness produced according to the methods described herein, and for adding an activated sorbent, including a chemically-enhanced activated sorbent or activated sorbent having enhanced effectiveness produced according to the methods described herein, to a gas stream having one or more gaseous pollutants or vapor phase contaminants to adsorb or remove those pollutants or contaminants from the gas stream. More particularly, methods are described for separating a solid activated sorbent produced according to any of the methods described herein from the gas stream used to activate the sorbent and for subsequently adding the solid activated sorbent into a gas stream having one or more gaseous pollutants or vapor phase contaminants to adsorb and remove such pollutants or contaminants. For example, methods and equipment are described for separating the solid activated sorbent from the gas stream used to activate the sorbent and then pulverizing or grinding the sorbent before adding it to a gas stream containing one or more gaseous pollutants or vapor phase contaminants to be adsorbed using the sorbent. Further, after separating the activated sorbent from the gas stream used to activate the sorbent, that gas stream can be added back to a combustion device or boiler. Alternatively, or in combination, that gas stream or a portion thereof can be added to the gas stream having one or more gaseous pollutants or vapor phase contaminants. However, that gas stream may first be sent to a gas burner where volatile organic compounds and any carbon monoxide is burned and where certain chemicals, which may include many of the same chemicals used to enhance the effectiveness of the activated sorbent, can be added. These chemicals are then subjected to the high temperature of the gas burner and converted into chemicals that can enhance the removability of various gaseous pollutants or vapor phase contaminants, for example, by altering the chemical form of the gaseous pollutants or vapor phase contaminants. Further, the gas stream containing these chemicals may be added to various locations in a combustion process. Alternatively, as described herein, a portion of the gas stream carrying the activated sorbent produced by any of the methods described herein can itself be added directly to a gas stream having one or more gaseous pollutants or vapor phase contaminants, and the remaining portion can be separated into a stream of solid activated sorbent and a separated gas stream that can be processed as described above.

The foregoing methods and equipment are described in more detail below along with other exemplary embodiments of the invention. These embodiments are described in conjunction with the accompanying drawings, which are not necessarily drawn to scale and in which identical reference numerals throughout the figures identify common elements and dotted lines illustrate optional features. The following description is not intended to be limiting, as it will be apparent to one of skill in the art that certain modifications may be made to the various exemplary embodiments. Accordingly, such modifications are intended to be within the scope of the present invention. Further, it should be appreciated that the terms "sorbent" and "activated sorbent" may be used interchangeably, such that the generation of an activated sorbent from a sorbent precursor, such as a raw carbonaceous material, may be referred to simply as a "sorbent." Similarly, the terms "pollutant" and "contaminant" may be used interchangeably.

FIG. 1 illustrates a process flow diagram for a combustion device and a pollution removal system in which various embodiments of the present invention may be utilized. The combustion device 102, such as a fossil-fuel-fired boiler, uses air 104 to combust fuel 106, such as a fossil fuel, for example, coal, to produce heat for use. The combustion of the fuel 106 produces an exhaust gas or flue gas that exits the combustion device 102 through a combustion device outlet duct 108. The flue gas produced within the combustion device 102 is generally comprised of air; gaseous products of combustion, such as water vapor, carbon dioxide, oxides of nitrogen and sulfur, halides, organic compounds, mercury, selenium, and other trace metal vapors; and particulate matter or fly ash. The pollution removal system comprises a particulate collection device 110, such as a wet or dry electrostatic precipitator or a baghouse, and optionally, a scrubber 112, such as a wet scrubber. The particulate collection device 110 is connected to the combustion device outlet duct 108 and removes particulate matter from the flue gas. The flue gas then passes from the particulate collection device 110 through a particulate collection device outlet duct 114 to a stack 116 where the flue gas 118 is discharged to the atmosphere. Alternatively, the flue gas passes from the particulate collection device 110 to the scrubber 112 (as shown by the dashed line) and from the scrubber 112 through a scrubber outlet duct 120 and to the stack 116 where it is discharged to the atmosphere. It should be appreciated that this process is only exemplary, and the methods and apparatuses of the present invention generally may be used in connection with any gas stream in any process.

Figure 2:
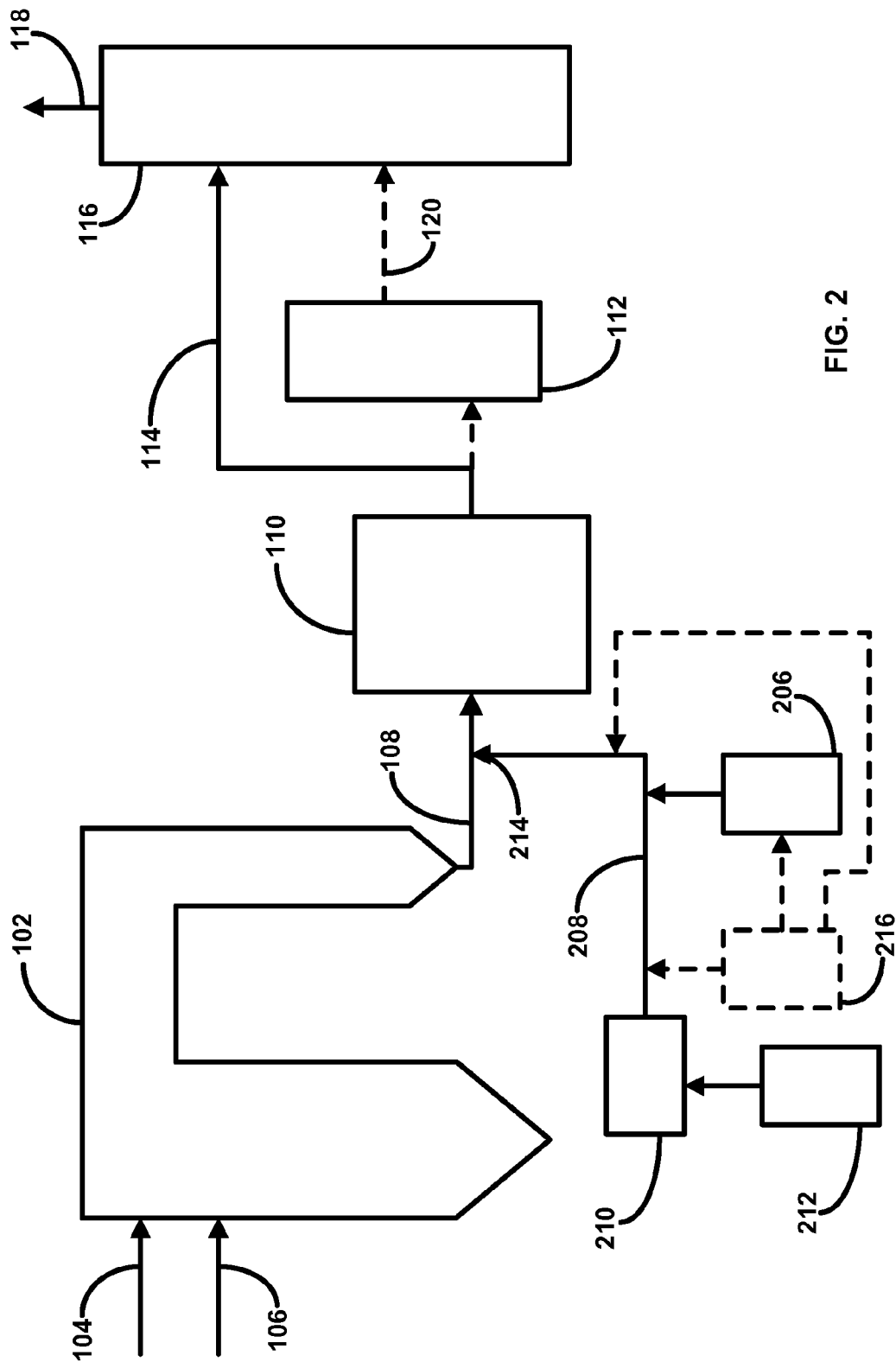
FIG. 2 illustrates a process flow diagram for generating a sorbent having an enhanced effectiveness and adding it to a flue gas stream according to one embodiment of the invention.

FIG. 2 illustrates a process flow diagram for generating an activated sorbent having an enhanced effectiveness and adding it to a flue gas stream according to one embodiment of the invention. In particular, FIG. 2 illustrates an embodiment in which a sorbent precursor is added to a gas stream to produce an activated sorbent. In addition, one or more chemicals are added to this gas stream to enhance the effectiveness of the activated sorbent, which is then added to a flue gas stream containing a gaseous pollutant, such as the flue gas stream illustrated in FIG. 1, to remove the gaseous pollutant from the flue gas stream.

An addition device 206 is used for adding a sorbent precursor, such as a raw carbonaceous material, to a gas stream 208, which may be referred to as an activating gas stream, provided by a gas stream source 210. The addition device 206 can be any mechanical or pneumatic device that feeds the raw carbonaceous material in either dry or slurry form.

It should be appreciated that there may be more than one additive device for adding sorbent precursor to the activating gas stream 208. Further, it should be appreciated that the gas stream residence time for any given addition location or point where the sorbent precursor is added to the gas stream 208, which is the amount of residence time of the flue gas from the addition location to the additional location where the then activated sorbent is added to the flue gas stream, will affect the degree of activation of the sorbent precursor. In some embodiments, a gas stream residence time of approximately about 0.1 to about 30 seconds should be suitable to activate raw carbonaceous material, and in other embodiments, a gas stream residence time between about 0.1 and about 5 seconds is suitable.

In this embodiment, the raw carbonaceous material may be any carbonaceous material such as coal, wood, petroleum coke, biomass materials, sewage sludge, organic wastes or other carbonaceous material and can also be a liquid or gas derived from organic liquids such as residual or distillate oils, or organic gases containing hydrocarbons such as methane, ethane, propane, butane, and ethylene or alcohols such as methanol and ethanol. Preferably organic gases contain molecules that have up to about eight carbon atoms.

The gas stream source 210 may be any source or device used to provide a gas stream suitable to activate a sorbent precursor, such as raw carbonaceous material, and carry it to the flue gas generated by the combustion device 102. The gas stream source 210 may be a separate combustor that generates a gas stream, or it may be a waste heat stream that is generated in a separate process or separate location from the combustion device 102. The gas stream source 210 may also be a gas stream formed by the combination of different gases, for example, by the combination of cylinder gases, that allows for the generation of a particular gas composition and temperature suitable for activating the sorbent precursor, such as raw carbonaceous material.

In this embodiment, it should be appreciated that it is the temperature of the activating gas stream 208 from the gas stream source 210 that must be sufficient to activate the sorbent precursor to produce an activated sorbent. Accordingly, it should be appreciated that the temperature of this activating gas stream 208 may be adjusted to provide the desired temperature or the desired amount of activation. In one embodiment in which the sorbent precursor is a raw carbonaceous material, the activating gas stream 208 has an activation temperature between about 100° C. and about 1400° C.

In particular, if the sorbent precursor is a liquid or gas phase raw carbonaceous material, the activation temperature in some embodiments is between about 500° C. and about 1200° C. so that cracking, pyrolysis, partial oxidation, or gasification of the liquid or gas occurs to produce fine carbonaceous particles. Upon activation, if the raw carbonaceous material is a liquid or gas, cracking, pyrolysis, partial oxidation, or gasification occurs to form fine carbonaceous particles, for example, soot. The particle size of the raw carbonaceous material, or the fine carbonaceous particles formed from the liquid or gas, should be fine enough to suspend the individual particles in the flue gas stream. In some embodiments, the particles are less than about 100 μm in size, and in other embodiments, the particles are less than about 10 μm in size. The raw carbonaceous material can be added in either a dry powdery form or as a wet slurry form, such that the heat of the flue gas will evaporate at least some of the suspending fluid, leaving the raw carbonaceous material suspended in the flue gas stream.

A chemical addition device 212 is used to add one or more chemicals to the gas stream source 210. The chemical addition device 212 may be any device known in the art suitable for adding a given chemical compound to the gas stream source 210. Alternatively, or in addition to the chemical addition device 212 that adds certain chemicals to the gas stream source 210, another chemical addition device 216, as shown by the dotted-lines, may be used to add the desired chemical(s) directly to the gas stream 208 produced by the gas stream source 210 downstream of the gas stream source 210 but upstream of the addition device 206 that adds the raw carbonaceous material to the gas stream 208 produced by the gas stream source 210. Alternatively, or in addition, this chemical addition device 216 may add the desired chemical(s) to the addition device 206 that adds the sorbent precursor to the gas stream 208 produced by the gas stream source 210, thereby adding the chemical concurrently with the sorbent precursor to the gas stream 208 produced by the gas stream source 210. In this case, the sorbent precursor and the chemical being added can be mixed using various methods depending upon the specific sorbent precursor and chemical used. Alternatively, or in addition to any of the other addition locations, this chemical addition device 216 may add the desired chemical(s) to the activating gas stream 208 downstream of the point where the sorbent precursor is added by addition device 206.

The chemicals added using the chemical addition device 212, 216 are used to enhance the activity or effectiveness of the activated sorbent derived from the sorbent precursor. Accordingly, this chemical may be any one or more chemicals or chemical compounds that will enhance the activity or effectiveness of the activated sorbent such that the removal of a given vapor phase contaminant under the same conditions is increased compared to the same sorbent prepared without such chemical.

In some embodiments, the chemical(s) added combines with the activated sorbent and upon interaction with a given gaseous pollutant may catalyze a particular reaction with the gaseous pollutant making it more easily adsorbed by the sorbent. For example, noble and transition metals may be used as the chemical(s) that enhance the effectiveness of the sorbent by catalyzing the oxidation of mercury, a gaseous pollutant, thereby making the oxidized mercury more easily adsorbed by the sorbent. Such noble and transition metals may be added as metals or metal-based compounds using the chemical addition device 212, 216. In other embodiments, other chemicals may catalyze or impact the sorbent activation reaction itself (e.g., activation rate, porosity/pore size, BET, etc.) and thus enhance the activity of a sorbent.

In one embodiment, the chemical added is calcium bromide to enhance the activity or effectiveness of activated carbon. The calcium bromide can be added using any of the method and chemical addition devices 212, 216 described above. For example, the calcium bromide may be injected as a powder or solution into either the gas stream source 210 or the activating gas stream 208. Alternatively the calcium bromide may be mixed with the sorbent precursor or wet impregnation may be used to add the calcium bromide to the sorbent precursor prior to adding this mixture to the activating gas stream 208.

It should be appreciated that by adding the calcium bromide as the chemical to a given gas stream as described above when using a raw carbonaceous material as the sorbent precursor, the raw carbonaceous material can be both activated and chemically-enhanced through bromination to a form of brominated activated carbon. Moreover, by adding the calcium bromide as described above, the raw carbonaceous material can be converted into the brominated activated carbon basically in one process step. In other words, it is not necessary to first produce the activated carbon using separate process equipment and to then separately brominate the activated carbon. In the processes described above, the activation and bromination occurs within the same process equipment, in-situ, and on-site where it is to be used. In some embodiments, the brominated activated carbon can be used to remove mercury from the gas or flue gas stream.

In other embodiments, the chemical added includes one or more of iron and various transition and noble metals (e.g., nickel, cobalt, copper, manganese, chromium, platinum, palladium, and ruthenium) and related compounds of such iron, transition, or noble metals (oxides, salts, chelates, complexes, and other alike compounds) to enhance the activity or effectiveness of an activated sorbent such as activated carbon. When utilizing these metals or related compounds, it should be appreciated that it is desirable to maximize their exposed surface area to obtain the maximum effect. Accordingly, the metal or metal-based compound, or combinations thereof, are dispersed into the given activating gas stream 208, as described above, as relatively fine to very fine particles to allow the particles to enter the pores of the activated carbon. In some embodiments, the metals are added to the activating gas stream 208 as a metal compound solution, which can be added separately or concurrently with the sorbent precursor. In other embodiments, a metal compound solution is used to impregnate a sorbent precursor, and the mixture is then added to the activating gas stream 208 for activation. In this case, the heat from the activating gas stream 208 will evaporate the water and decompose the metal salt or other compounds to allow the metal to interact and disperse into the activated carbon. The required temperature of the activating gas stream 208 into which the metal salt solution is added will vary depending upon the composition of the metal compound solution. However, the addition point where the metal compound solution is added to the activating gas stream 208 can be selected based upon the temperature profile of the activating gas stream 208 to ensure that the metal compound solution is heated to the appropriate temperature to evaporate the water and decompose the metal salt. In some embodiments, this temperature should be between about 100° C. and about 1400° C.

In some embodiments, iron or iron-based compounds are used as the chemical to provide a high metal surface area of iron in the activated carbon that can potentially be very effective for selenium adsorption, as iron has been shown to be a good getter of selenium. Further, activated carbon impregnated with iron can provide an activated carbon with magnetic properties. This may make the iron-impregnated activated carbon easy to separate from other particles, such as fly ash or scrubber solids, by utilizing the magnetic property to achieve separation. The iron can be added in any of the ways described above for other chemicals.

In other embodiments, the chemical added can be any halogen element or halogen-based compound, including, for example, chlorides, iodides, and fluorides. These halogens can be added in any of the ways described above for other chemicals as halogens or halogen-based compounds and may be added as their respective salts. When using such halogens with a raw carbonaceous material as the sorbent precursor, it should be appreciated that in some embodiments such halogens will attach to the activated carbon being produced to make it more reactive to mercury thereby increasing the adsorption of the mercury.

In still other embodiments, the chemical added can be an alkali. For example, a sodium-, calcium-, or magnesium-based alkali compound may be used.

Returning to FIG. 2, after addition of the sorbent precursor and the desired chemical to the activating gas stream 208, the sorbent precursor is activated in-situ by the heat of the activating gas stream 208, and its activity is enhanced by the presence of, or reaction with, the chemical(s) added by the chemical addition device 212 (or by another chemical addition device 216 or by both devices 212, 216) to produce a chemically-enhanced activated sorbent or a sorbent having enhanced activity.

The chemically-enhanced activated sorbent is then added to the flue gas stream at an addition location 214 anywhere along the combustion device outlet duct 108. Accordingly, this addition location 214 is downstream of the combustion device 102 and upstream of the particulate collection device 110. Once in the flue gas stream, the chemically-enhanced activated sorbent is available to adsorb gaseous pollutants in the flue gas stream. The chemically-enhanced activated sorbent along with any adsorbed gaseous pollutants is then collected in the particulate collection device 110 and removed from the flue gas stream.

It should be appreciated that there may be more than one addition location where the chemically-enhanced activated sorbent is added to the flue gas stream; however, since the particulate collection device 110 is used to collect the chemically-enhanced activated sorbent along with any adsorbed gaseous pollutants and remove it from the flue gas, the addition locations must be positioned upstream of the particulate collection device 110. But, these addition locations may be anywhere along the combustion device outlet duct 108.

It should be appreciated that the amount of adsorption of the various gaseous pollutants will also depend upon the gas stream residence time between the addition point of the chemically-enhanced activated sorbent and the point of collection of the activated sorbent in the particulate collection device 110. It should be appreciated that the amount of removal of the gaseous pollutants will also depend upon the amount of contact between the gas phase and the gaseous pollutants and the chemically-enhanced activated sorbent. The degree of removal will also depend upon the composition of the chemically-enhanced activated sorbent and the composition of the gaseous pollutants.

The equipment described above in connection with FIG. 2 can also be used to implement various other embodiments of the invention. In these embodiments, certain chemicals are added to the flue gas stream to react with a given gaseous pollutant and convert it to a form that is more easily removed from the gas stream compared to its original form, for example, by using an activated sorbent. With reference to FIG. 2, these chemicals can be added to the flue gas stream through addition to the activating gas stream 208 by the chemical addition device 212, or additional chemical addition devices 216. Alternatively, or in addition, these chemicals can be added directly to the flue gas stream at an addition location (not shown) in the combustion device outlet duct 108.

Once added to the flue gas stream, the chemicals will react with a given gaseous pollutant to convert it to a form that is more easily removed from the flue gas stream. One method by which the converted form of the gaseous pollutant can be removed from the gas stream is through the use of an activated sorbent, including, for example, commercially available sorbents, sorbents produced on-site, and sorbents produced according to the methods described herein, such as activated sorbents produced with the addition of certain chemicals that enhance the activated sorbent's effectiveness as described above. These sorbents can be added to the combustion device outlet duct 108, and in some embodiments are added downstream of the location where the chemicals are added to the flue gas stream. In other embodiments, the chemicals and the activated sorbent may be added to the flue gas stream concurrently with the chemicals. For example, the chemicals and an activated sorbent could be added concurrently to the flue gas stream utilizing the equipment shown in FIG. 2. It should be appreciated that the converted forms of certain gaseous pollutants may also be more easily removed using other equipment as well, such as the particulate collection device 110 or the scrubber 112.

For example, in one embodiment, the chemicals added to the flue gas stream include certain ions and gases that can be generated and added to assist in the removal of certain gaseous pollutants. These ions and gases react with one or more gaseous pollutants to alter its chemical composition to a form that allows it to be more easily removed from the gas stream. For example, a high temperature reactor can be used to decompose bromine compounds, such as sodium and calcium bromide, into chemically reactive bromine ions and gases, such as bromine gas, elemental bromine, or hydrogen bromide. The required temperature of the gas stream into which the bromine compound is added should be high enough to achieve decomposition and in some embodiments will be in the range of about 300° C. to about 1700° C. These bromine ions and gases can be added, for example, to a flue gas stream from a coal-fired boiler that contains elemental mercury to oxidize the elemental mercury to an oxidized form of mercury. Since such ions and gases may be corrosive inside a boiler, in some embodiments, these ions and gases can be advantageously added to the flue gas stream downstream of the boiler. The oxidized form of mercury can then be more easily removed from the gas stream, for example, with the use of an activated sorbent, including, for example, commercially available sorbents, sorbents produced on-site, and sorbents produced according to the methods described herein, such as activated sorbents produced with the addition of certain chemicals that enhance the activated sorbent's effectiveness as described above. Such oxidized form of mercury could also be more easily removed from the flue gas stream through absorption in a wet $SO_x$ scrubber.

In other embodiments, the chemical added can be any halogen element or halogen-based compound, including, for example, chlorides, iodides, and fluorides. These halogens can be added in any of the ways described above for other chemicals as halogens or halogen-based compounds and may be added as their respective salts. In some embodiments, these halogens work in the same way as the bromides to oxidize elemental mercury to an oxidized form of mercury that can be more readily removed from the gas stream via activated carbon or by absorption in a wet $SO_x$ scrubber.

It should be appreciated that the chemicals added to the flue gas stream to convert a given gaseous pollutant to a form that is more easily removed, may be the same chemicals used to enhance the activation of a given activated sorbent as described above. In this case, the equipment shown in FIG. 2 may be used to produce a chemically-enhanced activated sorbent as well as to add additional chemicals to the flue gas stream to react with given gaseous pollutants, which may, in turn, be removed or adsorbed by the chemically-enhanced activated sorbent. In other words, the amount of chemicals added by the chemical addition device 212, 216 would be greater than that required to only enhance the activity of the activated sorbent, such that the additional chemical would be available to react with a given gaseous pollutant once added to the flue gas stream via the activating gas stream 208. As noted above, the chemicals could alternatively, or in addition, be added directly to the flue gas stream at a separate location along the combustion device outlet duct 108; however, it should be appreciated that in some embodiments, this separate addition location is upstream of the addition location where the chemically-enhanced activated sorbent is added to the combustion device outlet duct 108. One example of such an embodiment is the use of bromine compounds. As noted above, bromine can be used to brominate an activated carbon and thereby chemically enhance its activity as a sorbent, and bromine compounds can be added to a gas stream that contains elemental mercury to oxidize the elemental mercury to an oxidized form of mercury that is more easily removed, for example, by the chemically-enhanced activated carbon.

In other embodiments, the chemicals added may be different than those used to produce a chemically-enhanced activated sorbent. With reference to FIG. 2, in this case, the chemicals used to produce a chemically-enhanced activated sorbent can be added as described above, and the chemicals being added to the flue gas stream to react with a given gaseous pollutant may be added concurrently with the chemicals used to produce a chemically-enhanced activated sorbent or separately. In the latter case, the chemicals could still be added to the activating gas stream 208 or separately and directly added to the combustion device outlet duct 108.

It should be appreciated that in the embodiment where an activated sorbent is added to the flue gas stream or the combustion device outlet duct 108 separately from the chemicals being added to the flue gas stream, that the amount of chemicals added can be increased beyond the amount needed to react with a given gaseous pollutant. This additional amount of the chemicals can then be used to chemically enhance the activated sorbent present in the flue gas stream. Of course, in this case, the chemicals added to the flue gas stream would need to be the same chemicals that could be used to chemically enhance the activated sorbent. In addition, the location where the chemicals and the activated sorbent are added to the flue gas stream would have to be positioned to provide sufficient time and temperature to chemically enhance the activated sorbent.

Figure 3:
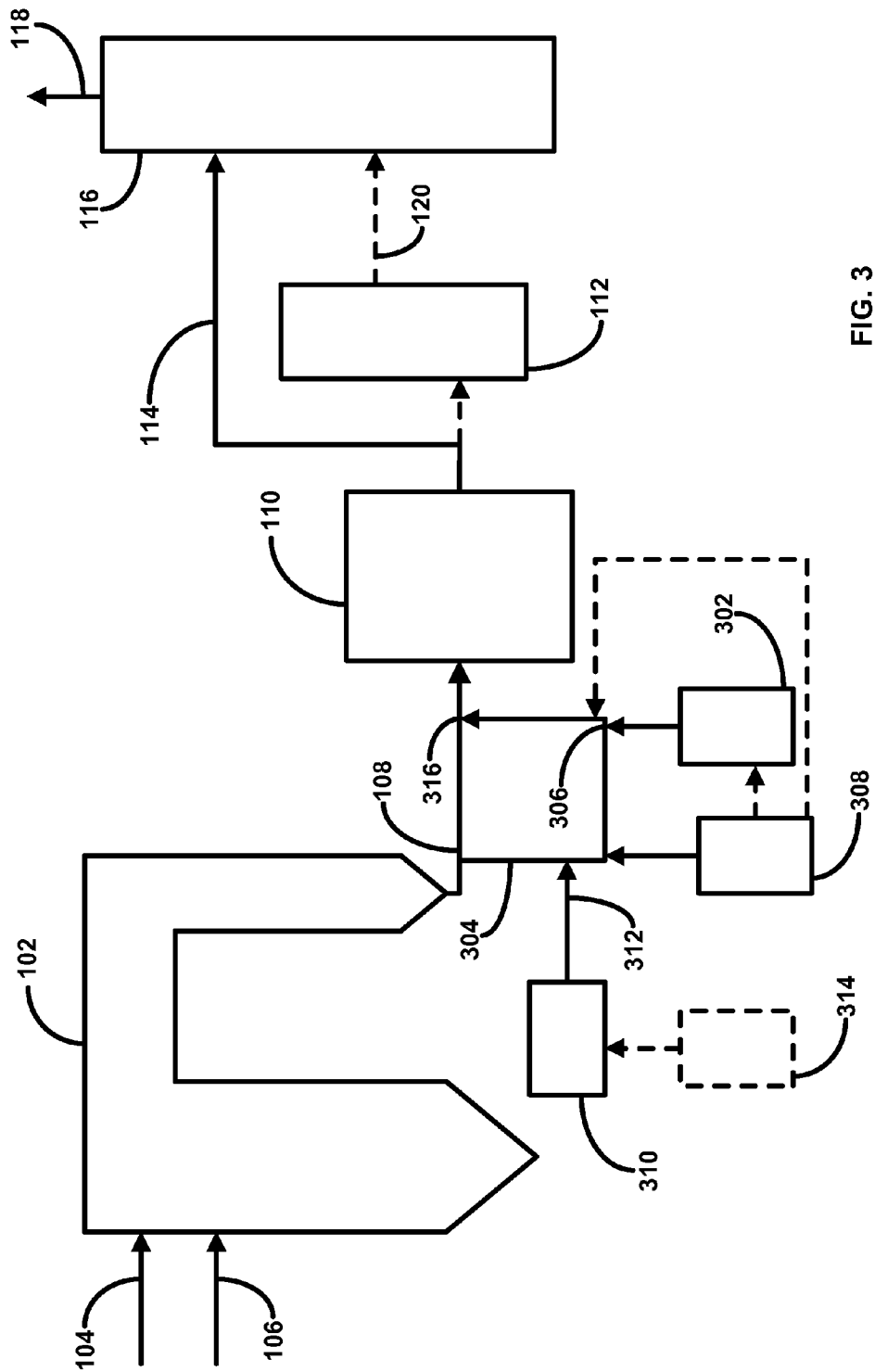
FIG. 3 illustrates a process flow diagram for generating a sorbent having an enhanced effectiveness in a slipstream of gas and adding it to a flue gas stream according to one embodiment of the invention.

FIG. 3 illustrates a process flow diagram for generating a sorbent having an enhanced effectiveness in a slipstream of gas and adding it to a flue gas stream according to one embodiment of the invention. This embodiment is illustrated using the same process flow diagram from FIG. 1. In this embodiment, the sorbent precursor, such as a raw carbonaceous material, is added by an addition device 302 to a slipstream 304 of flue gas at an addition location 306. The addition device 302 can be any mechanical or pneumatic device that feeds the raw carbonaceous material in either dry or slurry form at the desired addition location 306. Similar to FIG. 2, a chemical(s) used to enhance the activity of the activated sorbent produced from the sorbent precursor is added using a chemical addition device 308 to the slipstream 304 upstream of the addition location 306 for the sorbent precursor, to the sorbent precursor addition device 302 (as shown by the dotted line extending from the chemical addition device 308 to the second addition device 302) such that the chemical(s) is added concurrently with the sorbent precursor, or downstream of the addition location 306 for the sorbent precursor (as shown by the dotted line extending from the chemical addition device 308 to a location downstream of the addition location 306). As described in connection with FIG. 2, the chemical addition device 308 may be any device known in the art suitable for adding a given chemical compound to a desired location or piece of equipment. Further, any of the chemicals described in connection with FIG. 2 may be used in the embodiment shown in FIG. 3.

FIG. 3 also illustrates an activation gas generator 310 that produces an activating gas stream 312. The activating gas stream 312 is added anywhere along the slipstream 304 upstream of the addition location 306 for the sorbent precursor but upstream or downstream of the addition location for any chemical(s) added directly to the slipstream 304 by the chemical addition device 308. This activating gas stream 312 may be used to supplement the activating function of the flue gas in the slipstream 304. The activation gas generator 310 may, for example, be a source of steam or $CO_2$. Accordingly, a chemical addition device 314 may alternatively be used, alone or in combination with the chemical addition device 308 that adds the chemical(s) to the slipstream 304 or to the addition device 302, to add the chemical(s) to the activation gas generator 310 or to the activating gas stream 312.

In this embodiment, the sorbent precursor, such as a raw carbonaceous material, is activated in-situ by the heat of the slipstream 304, supplemented as necessary with the activating gas stream 312, and its activity is enhanced by the presence of, or reaction with, the chemical(s) added by either one of, or both of, the chemical addition devices 308, 314 that add the chemical(s) used to enhance the activity of the activated sorbent produced from the sorbent precursor. The chemically-enhanced activated sorbent is then added back to the flue gas at an addition location 316, noting that this location may be positioned anywhere along the combustion device outlet duct 108 downstream of the point where the slipstream is taken from the flue gas in the combustion device outlet duct 108 and upstream of the particulate collection device 110.

It should be appreciated that the same methods described above in connection with FIG. 2 for the addition of certain chemicals to the flue gas stream for purposes of reacting with a given gaseous pollutant can be applied to the process illustrated in FIG. 3. Accordingly, the same equipment described in connection with FIG. 3 for the addition of chemical(s) used to enhance the activity of an activated sorbent can be used to simply add chemicals to the flue gas stream to react with a given gaseous component and convert it into a form that is more easily removed. Such removal may be accomplished in the same manner as that described above in connection with FIG. 2 as well. Further, the same variations described above in connection with FIG. 2, including the use of the same or different chemicals for reacting with a given gaseous pollutant and for chemically enhancing the activity of a given activated sorbent, as well as the addition of chemicals to the flue gas stream to both react with a given gaseous pollutant and to chemically enhance an activated sorbent that is separately added to and present in the flue gas stream, may be implemented in the process described in connection with FIG. 3.

Figure 4:
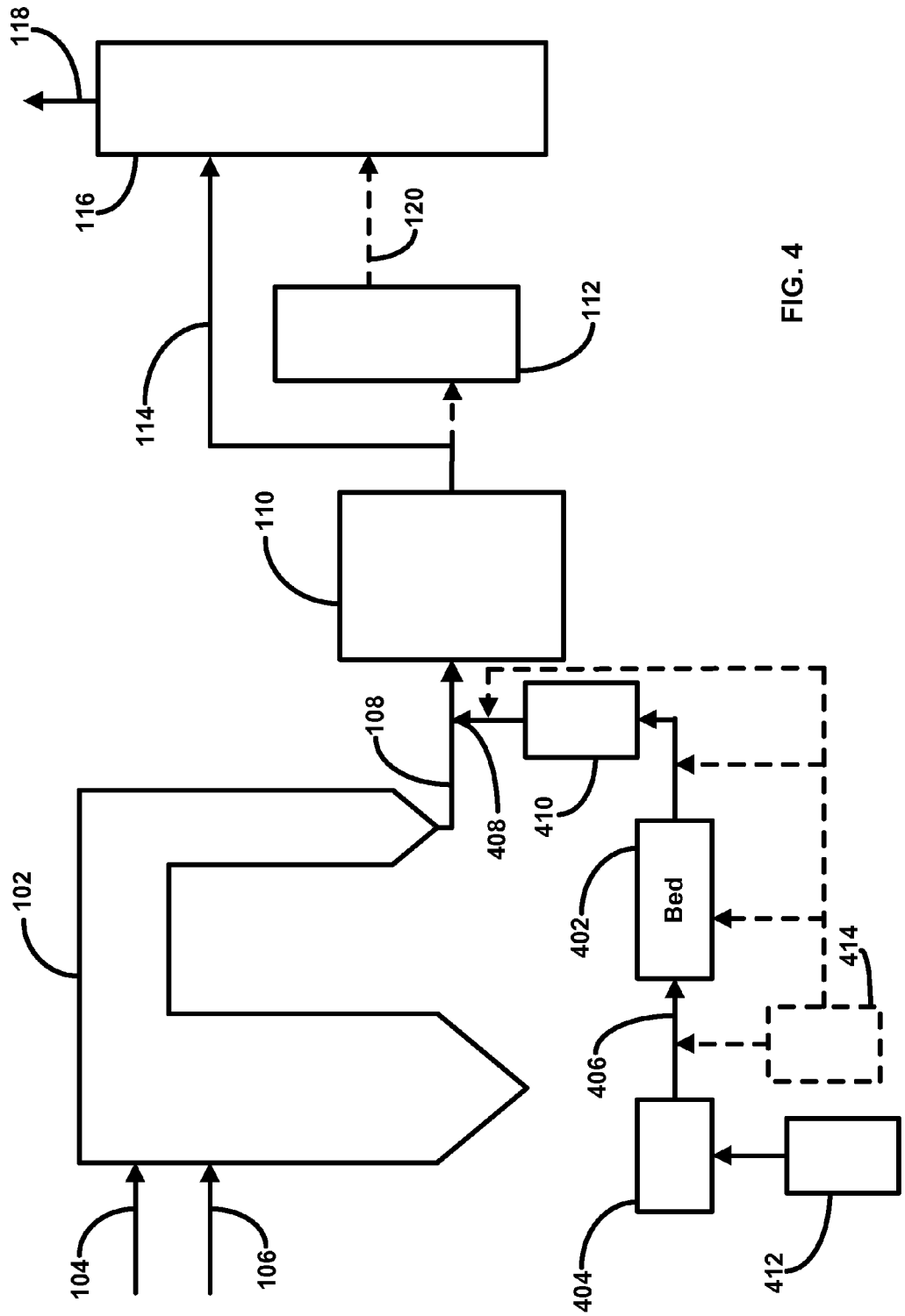
FIG. 4 illustrates a process flow diagram for adding a sorbent generated from a bed of raw carbonaceous material and having an enhanced effectiveness to a flue gas stream according to another embodiment of the invention.

FIG. 4 illustrates a process flow diagram for adding a sorbent generated from a bed of sorbent precursor and having an enhanced effectiveness to a flue gas stream according to another embodiment of the invention. This embodiment is illustrated using the same process flow diagram from FIG. 1. In this embodiment, a sorbent precursor, such as a raw carbonaceous material, is used in a bed 402 from which an activated sorbent is generated. A gas source 404 is used to provide an activating gas stream 406 that is provided, in this embodiment, to the bed 402 to activate the sorbent precursor in the bed 402, such as a fluidized or fixed bed. More specifically, the activating gas stream 406 is applied at a suitable temperature and for an appropriate residence time to activate the sorbent precursor in the bed 402, such as a suitable temperature to activate a raw carbonaceous material into an activated carbon.

The gas stream source 404 may be any source or device used to provide an activating gas stream suitable to activate the sorbent precursor in the bed 402. The gas stream source 404 may be a separate combustor that generates a gas stream, or it may be a waste heat stream that is generated in a separate process or separate location from the combustion device 102. The gas stream source 404 may also be a gas stream formed by the combination of different gases, for example, by the combination of cylinder gases, that allows for the generation of a particular gas composition and temperature suitable for activating the sorbent precursor. In this embodiment, it should be appreciated that it is the temperature of the activating gas stream 406 from the gas stream source 404 that must be sufficient to activate the sorbent precursor in the bed 402. Accordingly, it should be appreciated that the temperature of the activating gas stream 406 may be adjusted to provide the desired temperature or the desired amount of activation. In one embodiment, the gas stream 406 has an activation temperature between about 100° C. and about 1400° C. The exhaust from the bed 402 can be recycled to the combustion device 102.

As the activating gas stream 406 passes through the bed 402, the sorbent precursor is activated in-situ by the heat of the activating gas stream 406. In some embodiments, the bed 402 initially comprises a raw carbonaceous material that is an unactivated carbon in the form of any one or more of coal, wood, petroleum coke, biomass materials, sewage sludge, organic waste, and the like. The unactivated carbon forms an unactivated carbon bed, which is any accumulation of unactivated carbon positioned on a substrate. The gas stream 406 from the gas stream source 404 is passed through the bed 402, for example, by routing the gas stream underneath the bed 402, such that the gas stream passes through the bed 402.

The resulting activated sorbent can be withdrawn continuously from the bed 402, either as a stream of solid particles in which case, the activating gas stream can be discharged or recycled, or suspended in a gas stream, noting that this gas stream may be the activating gas stream 406 that is fed to the bed 402 or a separate gas stream (not shown). The activated sorbent is conveyed to a sorbent addition device 410 and added to the flue gas stream at an addition location 408 using the addition device 410, which can be any mechanical or pneumatic device that feeds the activated sorbent at the desired addition location 408. It should be appreciated that the activated sorbent can be added at any point along the combustion device outlet duct 108 and upstream of the particulate collection device 110. Fresh sorbent precursor is added to the bed 402 either continuously or batch-wise from a feeder (not shown).

Similar to FIG. 2, a certain chemical(s) can be added to the gas stream source 404 and subsequently passed to the bed 402 with the activating gas stream 406 to enhance the activity of the activated sorbent produced from the bed 402. In this case, a chemical addition device 412 is used to add the chemical(s) to the gas stream source 404 such that the raw carbonaceous material is activated and its activation is enhanced by the addition of the chemical(s) to produce a chemically-enhanced activated sorbent. As described in connection with FIG. 2, the chemical addition device 412 may be any device known in the art suitable for adding a given chemical compound to a desired location or piece of equipment. Further, any of the chemicals described in connection with FIG. 2 may be used in the embodiment shown in FIG. 4.

Alternatively, or in addition to the chemical addition device 412 that adds the chemical(s) to the gas stream source 404, as shown by the dotted lines, the chemical(s) can be added to the activating gas stream 406 produced by the gas stream source 404 using another chemical addition device 414. In this case, the chemical(s) can be added downstream of the gas stream source 404 but upstream of the bed 402, directly to the bed 402, downstream of the bed 402 but upstream of the addition device 410 that adds the activated sorbent to the flue gas stream, or downstream of that same addition device 410.

It should be appreciated that the same methods described above in connection with FIG. 2 for the addition of certain chemicals to the flue gas stream for purposes of reacting with a given gaseous pollutant can be applied to the process illustrated in FIG. 4. Accordingly, the same equipment described in connection with FIG. 4 for the addition of chemical(s) used to enhance the activity of an activated sorbent can be used to simply add chemicals to the flue gas stream to react with a given gaseous component and convert it into a form that is more easily removed. Such removal may be accomplished in the same manner as that described above in connection with FIG. 2 as well. Further, the same variations described above in connection with FIG. 2, including the use of the same or different chemicals for reacting with a given gaseous pollutant and for chemically enhancing the activity of a given activated sorbent, as well as the addition of chemicals to the flue gas stream to both react with a given gaseous pollutant and chemically enhance an activated sorbent that is separately added to and present in the flue gas stream, may be implemented in the process described in connection with FIG. 4.

Figure 5:
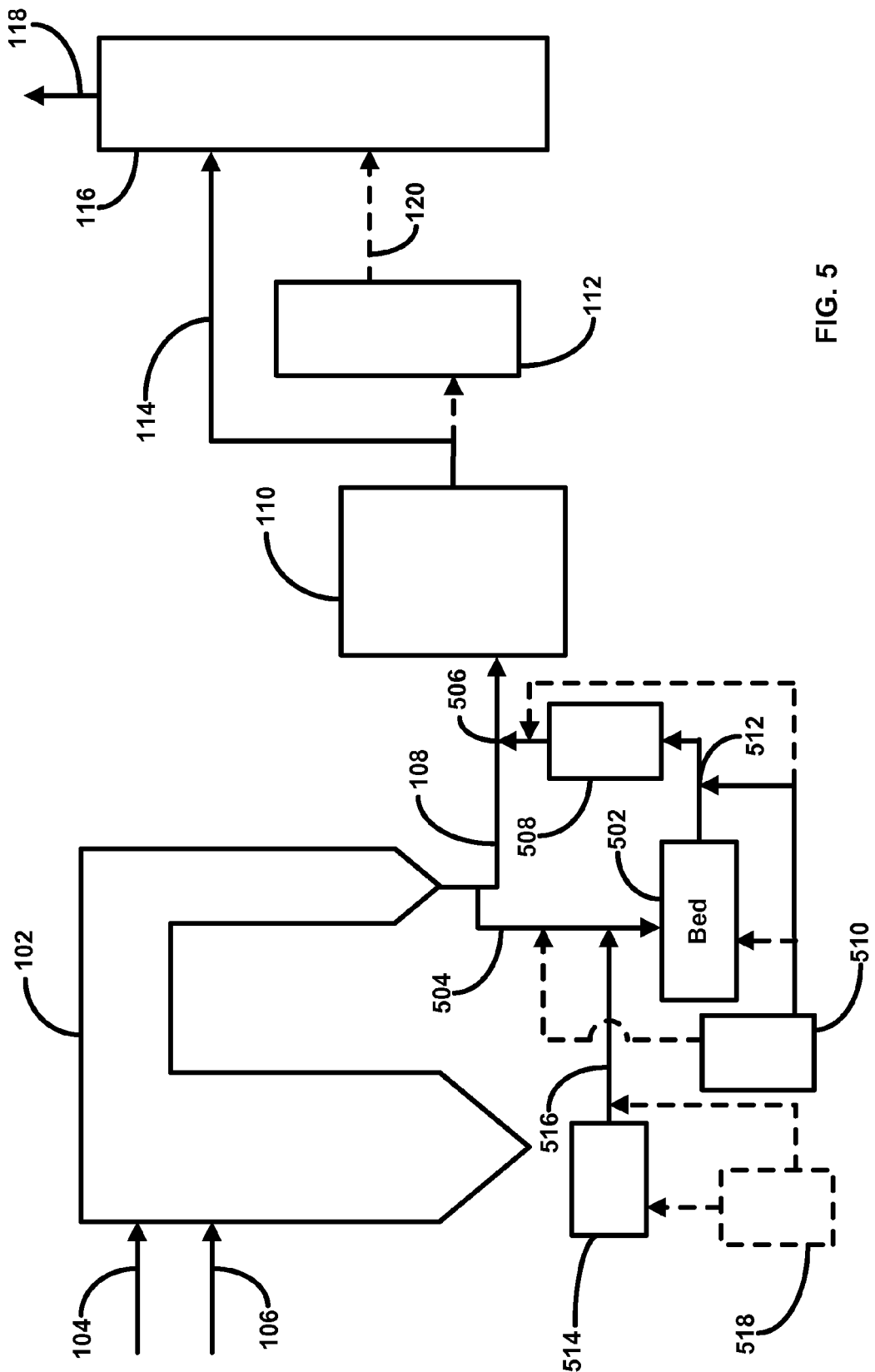
FIG. 5 illustrates a process flow diagram for adding a sorbent generated from a carbon bed and having an enhanced effectiveness to a slipstream of gas according to another embodiment of the invention.

FIG. 5 illustrates a process flow diagram for adding a sorbent generated from a carbon bed and having an enhanced effectiveness to a slipstream of gas according to another embodiment of the invention. This embodiment is illustrated using the same process flow diagram from FIG. 1. The process illustrated in FIG. 5 is similar to that of FIG. 3 in that a slipstream of flue gas is used and similar to that of FIG. 4 in that a bed of sorbent precursor is used to generate an activated sorbent having chemically-enhanced activity through the addition of a certain chemical(s) to the sorbent precursor or activated sorbent produced from the bed.

In this embodiment, similar to FIG. 4, a sorbent precursor, such as a raw carbonaceous material, is used in a bed 502 from which an activated sorbent is produced. A slipstream of flue gas 504 is taken from the combustion device outlet duct 108 and passed through the bed 502, such as a fluidized or fixed bed, to activate the sorbent precursor in the bed 502 in-situ by the heat of the slipstream 504. In some embodiments, the bed 502 initially comprises a raw carbonaceous material that is an unactivated carbon in the form of any one or more of coal, wood, petroleum coke, biomass materials, sewage sludge, organic waste, and the like. The unactivated carbon forms an unactivated carbon bed, which is any accumulation of unactivated carbon positioned on a substrate. The slipstream 504 is passed through the bed 502, for example, by routing the gas stream underneath the bed 502, such that the gas stream passes through the bed 502.

The resulting activated sorbent can be withdrawn continuously from the bed 502, either as a stream of solid particles in which case, the slipstream 504 can be discharged or recycled, or suspended in a gas stream, noting that this gas stream may be the activating gas stream that is fed to the bed 502 or a separate gas stream (not shown). The activated sorbent is conveyed to a sorbent addition device 508 and added to the flue gas stream at an addition location 506 using the addition device 508, which can be any mechanical or pneumatic device that feeds the activated sorbent at the desired addition location 506. It should be appreciated that the activated sorbent can be added at any point along the combustion device outlet duct 108 and upstream of the particulate collection device 110. Fresh sorbent precursor is added to the bed 502 either continuously or batch-wise from a feeder (not shown).

Similar to FIG. 2, a chemical(s) used to enhance the activity of the activated sorbent produced from the sorbent precursor is added using a chemical addition device 510 to the slipstream 504 downstream of the bed 502 or, in essence, to the addition device 508 at an addition point 512. Alternatively, or in addition, as shown by the dotted lines, the chemical addition device 510 may be used to add chemical(s) to the slipstream 504 upstream of the bed 502, directly to the bed 502, or downstream of the addition device 508 that is used to add the activated sorbent to the flue gas stream. As described in connection with FIG. 2, the chemical addition device 510 may be any device known in the art suitable for adding a given chemical compound to a desired location or piece of equipment. Further, any of the chemicals described in connection with FIG. 2 may be used in the embodiment shown in FIG. 5.

FIG. 5 also illustrates an activation gas generator 514 that produces an activating gas stream 516. The activating gas stream 516 can be added anywhere along the slipstream 504 upstream of the bed 502 or downstream of the bed 502 but upstream of the addition device 508 and as well as the addition point 512 for the chemical(s) (not shown). This activating gas stream 516 may be used to supplement the activating function of the flue gas in the slipstream 504. The activation gas generator 514 may, for example, be a source of steam or $CO_2$. Accordingly, a chemical addition device 518 may alternatively be used, alone or in combination with the chemical addition device 510 that adds the chemical(s) to the slipstream 504 or to the addition device 508, to add the chemical(s) to the activation gas generator 514 or to the activating gas stream 516.

In this embodiment, the sorbent precursor, such as a raw carbonaceous material, is activated in-situ by the heat of the slipstream 504, supplemented as necessary with the activating gas stream 516, and its activity is enhanced by the presence of, or reaction with, the chemical(s) added by either one of, or both of, the chemical addition devices 508, 518 that add the chemical(s) used to enhance the activity of the activated sorbent produced from the raw carbonaceous material. The chemically-enhanced activated sorbent is then added back to the flue gas at an addition location 506, noting that this location may be positioned anywhere along the combustion device outlet duct 108 downstream of the point where the slipstream is taken from the flue gas in the combustion device outlet duct 108 and upstream of the particulate collection device 110.

It should be appreciated that the same methods described above in connection with FIG. 2 for the addition of certain chemicals to the flue gas stream for purposes of reacting with a given gaseous pollutant can be applied to the process illustrated in FIG. 5. Accordingly, the same equipment described in connection with FIG. 5 for the addition of chemical(s) used to enhance the activity of an activated sorbent can be used to simply add chemicals to the flue gas stream to react with a given gaseous component and convert it into a form that is more easily removed. Such removal may be accomplished in the same manner as that described above in connection with FIG. 2 as well. Further, the same variations described above in connection with FIG. 2, including the use of the same or different chemicals for reacting with a given gaseous pollutant and for chemically enhancing the activity of a given activated sorbent, as well as the addition of chemicals to the flue gas stream to both react with a given gaseous pollutant and chemically enhance an activated sorbent that is separately added to and present in the flue gas stream, may be implemented in the process described in connection with FIG. 5.

It should be appreciated that the gas streams described above into which a sorbent precursor, such as a raw carbonaceous material, and chemicals are added to produce a chemically-enhanced activated sorbent (e.g., the gas stream generated by a gas stream source or the slipstream of flue gas) are contained within gas ductwork. Accordingly, the addition of the various components described above, such as the raw carbonaceous material and the chemical(s), basically react (e.g., activation of the raw carbonaceous material to activated carbon and reaction of the chemical with the activated carbon) within this gas ductwork. Accordingly, this gas ductwork can be viewed as a tubular reactor or high temperature reactor since the gas temperature can be adjusted to provide the necessary temperature and heat to activate and chemically-enhance the resulting product. However, it should be appreciated that other reactors known in the art could also be used.

Accordingly, the gas streams contained within this ductwork or reactor will have a temperature profile along the ductwork or reactor. Depending upon the composition of the sorbent precursor, such as a raw carbonaceous material, or the chemicals added to enhance the activation or effectiveness of the activated sorbent produced from such materials, the materials may need to be added at a specific addition location along the ductwork or reactor based upon the temperature profile. In other words, if a particular temperature is desired for activation of the raw carbonaceous material, then the addition location along the ductwork or reactor for that material should be selected so that the material is subjected to the desired temperature or range. Alternatively, the temperature of the gas in the ductwork or reactor can also be adjusted to provide the desired temperature range for a given addition location.

As noted, the foregoing descriptions of specific embodiments of the present invention made in connection with FIGS. 1-5 are presented for purposes of illustration and description. They are not intended to be exhaustive or to limit the invention to the precise forms disclosed as many modifications and variations are possible in view of the above teachings. For example, the above embodiments are described in the context of a combustion device, such as a coal-fired boiler, and the resulting flue gas. However, the various embodiments of the invention are applicable to any gas stream from which a gaseous pollutant or vapor phase contaminant needs to be removed. Further, the above embodiments are described in the context of the addition of a raw carbonaceous material as the sorbent precursor to be activated. However, other materials that can be used as a sorbent precursor and activated, such as titania and alumina, may be particularly useful in conjunction with the addition of iron and various transition and noble metals as described above. Other materials include limestone and lime as described in U.S. patent application Ser. No. 12/722,497, filed Mar. 11, 2010, which is incorporated by reference herein in its entirety.

Further still, it should be appreciated that multiple chemicals can be added to enhance the activity or effectiveness of the material to be activated. In this case, such chemicals can be added at the same or different addition locations and can be added concurrently or sequentially. The composition of the chemical added can also vary and include other chemicals not expressly described herein that are known to enhance the effectiveness of a particular material as a sorbent. For example, such chemicals may include steam, carbon dioxide, air, and sulfur-containing additives such as elemental sulfur in powder or gaseous form, each of which may enhance the effectiveness of, for example, activated carbon. Further, various equipment configures can be used to add the chemicals to the activating gas stream.

In addition, various combinations of chemicals may be used and added to the gas stream containing the gaseous pollutant(s) to react with and convert the gaseous pollutant or multiple gaseous pollutants to forms that are more easily removed. Further, various equipment configurations can be used to add the chemicals to the gas stream containing the gaseous pollutants.

Figure 6:
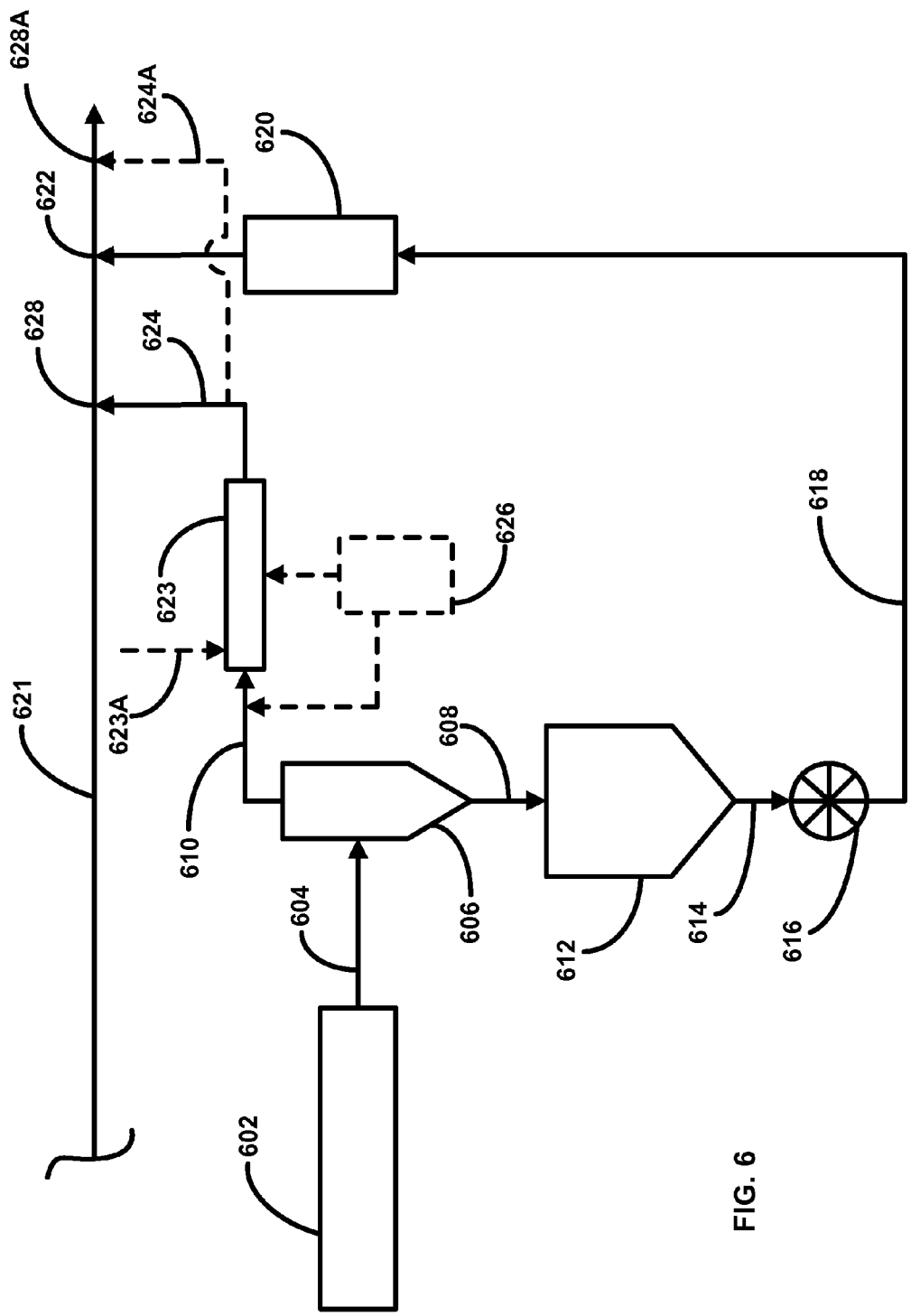
FIG. 6 illustrates a process flow diagram for separating a sorbent from an activating gas stream and adding the sorbent and optionally a chemical, such as a halogen or halogen salt, to a gas stream comprising at least one gaseous pollutant according to one embodiment of the invention.

FIG. 6 illustrates a process flow diagram for separating a sorbent from an activating gas stream and adding the sorbent and optionally a chemical, such as a halogen or halogen salt, to a gas stream comprising at least one gaseous pollutant according to one embodiment of the invention. An activated sorbent production process 602 is a process of preparing an activated sorbent having an enhanced effectiveness according to any of the methods described herein utilizing a sorbent precursor and an activating gas stream to produce a chemically-enhanced activated sorbent or a sorbent having enhanced activity. It should be appreciated, however, that the activated sorbent production process 602 may represent a process for preparing an activated sorbent with or without the addition of any other chemicals to enhance its effectiveness.

The activated sorbent production process 602 produces a gas stream 604 carrying the chemically-enhanced activated sorbent. The gas stream 604 produced by the activated sorbent production process 602 is passed to a gas/solid separator 606, which may be any gas/solid separator known in the art, such as a cyclone. The gas/solid separator 606 separates the gas stream 604 into a stream of activated sorbent 608, which may be a stream of activated solid sorbent particles passing from the gas/solid separator 606, and a gas stream 610, which is basically the totality of the gas stream 604 produced by the activated sorbent production process 602, which may also be the totality of the original activating gas stream.

The stream of activated sorbent 608 discharged from the gas/solid separator 606 is passed to a storage bin 612, which may be any storage bin suitable for holding or collecting the activated sorbent particles provided by the stream of activated sorbent 608 and which may serve as surge capacity for handling varying production rates of the activated sorbent particles produced by the activated sorbent production process 602. The activated sorbent particles collected by the storage bin 612 are passed as a stream 614 of solid particles to an optional pulverizer 616 that may be used to grind or pulverize the activated sorbent particles into a desired particle size or particle size distribution. The choice particle size or particle size distribution may be selected based upon the type of activated sorbent particles and the pollutant in the gas stream to be removed. In some embodiments, the activated sorbent particles may be ground into a fine powder.

The activated sorbent particles are passed as a stream 618 to a sorbent addition device 620. The activated sorbent particles may be passed to the sorbent additional device 620 as either stream of solid particles or as particles suspended in a gas stream, in which case a carrying gas stream would be added to suspend and carry the particles from the storage bin 612 or the optional pulverizer 614 if used. The sorbent addition device 620 is used to add the activated sorbent particles to a gas duct carrying a gas stream 621 that contains the gaseous pollutant to be adsorbed by the activated sorbent particles. The activated sorbent particles are added to the gas duct at a given addition location 622. The stream 618 of activated sorbent particles from the pulverizer 616 may be conveyed to the sorbent addition device 620 using any means known in the art, including, for example, a pneumatic conveying line. The sorbent addition device 620 may be any device that is capable of conveying a stream of solid particles into a gas stream, such as an injector.

The gas stream 610 separated by the gas/solid separator 606 is passed to a gas burner 623 that is used to burn or oxidize and remove any carbon monoxide, as well as any volatile organics, such as vaporous hydrocarbons, that may be present in the gas stream 610. The gas burner 623 uses fuel and an oxidant, such as air, to provide combustion, which also increases the temperature of the gas stream 610 to provide for burning of the carbon monoxide and any volatile organics. Accordingly, depending upon the amount of carbon monoxide and volatile organics present, the gas burner 623 should be operated with sufficient excess oxidant or air to burn these components. If additional oxidant is required for the gas burner 623, such may be provided by a stream of oxidant or air 623A supplied to the gas burner 623. For example, the stream of additional oxidant or air 623A can be provided by blowing additional oxidant or air into the gas burner 623 if operated under pressure or by providing enough holes through which an oxidant or air can be drawn into the gas burner 623 if operated under negative pressure.

A gas stream 624 exits the gas burner 623 and is added to the gas stream 621 that contains the gaseous pollutant. The gas stream 624 exiting the gas burner 623 may be added to the gas stream 621 containing the gaseous pollutant at any point along the duct containing this gas stream 621, including upstream or downstream of the addition location 622 where the activated sorbent particles are added to the gas stream 621.

The process shown in FIG. 6, in effect, takes the gas stream 604 from the activated sorbent production process 602 carrying the activated sorbent particles and separates it into a stream of solid particles and a gas stream that are separately added to the gas stream containing at least one gaseous pollutant for removal. Accordingly, it should be appreciated that the equipment used in the process shown in FIG. 6 can be sized to handle the gas stream flow rate and the amount of activated sorbent generated by the activated sorbent production process 602.

Further, it should be appreciated that in some embodiments, the raw carbonaceous material used to generate the activated sorbent in the activated sorbent production process 602 can be sized to provide optimal operation of gas/solid separator 606 to more efficiently separate the activated sorbent particles from the activation gas. For example, to optimize separation of the activated sorbent particles from the gas stream using the gas/solid separator 606, larger particles of the sorbent precursor or raw carbonaceous material may be more desirable. For example, larger particles of the sorbent precursor or raw carbonaceous material may be used in the activated sorbent production process 602 to present a larger particle size distribution to the gas/solid separator 606, which, in turn, allows the gas/solid separator 606 to separate the solid particles from the gas stream more efficiently compared to a smaller particle size distribution of activated sorbent particles being fed to the gas/solid separator 606. In some embodiments, activated sorbent particles that are less than approximately 10 μm are easier to separate in a mechanical separator such as a cyclone without significant energy requirements (i.e., there is a relatively low pressure drop across the cyclone) or without complex arrangements (e.g., using multiple cyclones).

It should be appreciated that although using a sorbent precursor with a larger particle size or particle size distribution, the activated sorbent production process 602 can still efficiently produce a useful activated sorbent. When using a relatively larger sorbent precursor, the particle size or particle size distribution of the activated sorbent will also be larger. However, to then prepare the activated sorbent particles for use in removing a given gaseous pollutant, the activated sorbent particles can be ground or pulverized to a desired size or particle size distribution using the optional pulverizer 616. For example, in some embodiments, the activated sorbent particles can be reduced to a particle size of approximately less than 10 μm using a pulverizer, such as a hammer, pin, or air jet mill, before being added to the gas stream containing a gaseous pollutant. Accordingly, in this embodiment, a relatively larger particle size sorbent precursor is used to provide a more efficient separation of the activated sorbent from the gas stream using a gas/solid separator to provide more of the activated sorbent particles to the gas stream for use in removing a given gaseous pollutant, but where the particle size or particle size distribution of the activated sorbent particles produced is subsequently reduced, for example by grinding or pulverization, before adding them to a gas stream containing at least one gaseous pollutant to be removed. In some embodiments, it is desirable to have an average particle size of activated sorbent particles of approximately less than 20 μm and in some embodiments less than 10 μm. Larger particles sizes can be used; however, the amount of activated sorbent required to provide a desired removal rate of a given gaseous pollutant may increase since the amount of available surface area per volume of activated sorbent would be less.

In this regard, in one embodiment, the sorbent precursor or raw carbonaceous material used in the activated sorbent production process 602 may be a slip-stream of pulverizer coal or coal from the pulverizer used to prepare the coal for injection into a coal-fired boiler. In other words, a slip-stream of the pulverizer coal that is already being produced for use in a boiler may be directed to the activated sorbent production process 602 and used as the sorbent precursor or raw carbonaceous material from which the activated sorbent is produced. In some embodiments, the amount of pulverizer coal required may be 1% or less of the total pulverizer coal being produced for the boiler. In some embodiments, the particle size or particle size distribution of the activated sorbent produced by the use of pulverized coal from a coal-fired boiler, which may be approximately 10-200 μm in some cases, is large enough to provide efficient separation of the activated sorbent particles from the activating gas stream in the gas/solid separator 606. In some embodiments, the particle size or particle size distribution of the coal produced by the pulverizer for a coal-fired boiler is approximately 70 μm, which will also provide efficient separation of the activated sorbent particles from the activating gas stream in the gas/solid separator 606. In some embodiments, if the particle size or particle size distribution of the sorbent precursor or raw carbonaceous material is in the range of 10-200 μm, subsequent grinding or pulverization of the activated sorbent using the optional pulverizer, may not be necessary to further reduce the particle size or particle size distribution of the activated sorbent. However, if the particle size distribution of the sorbent precursor or raw carbonaceous material is at the higher end of this range, for example, 100-200 μm or 70-200 μm, subsequent grinding or pulverization may be required to further reduce the particle size or particle size distribution of the activated sorbent to thereby provide an activated sorbent with a larger surface area to volume ratio, which is beneficial for gas adsorption. In these embodiments in which coal is used as the sorbent precursor or raw carbonaceous material in the activated sorbent production process 602, the use of a slip-stream of coal from the main boiler pulverizer avoids the need for a separate crusher or pulverizer that may otherwise be necessary to crush or pulverize the coal prior to use in the activated sorbent production process 602. However, it should be appreciated that coal can be taken from a co-located coal pile and separately ground or pulverized to provide a desired particle size or particle size distribution in the range of 10-200 μm or 70-200 μm.

Nonetheless, it should be appreciated that if the particle size of the sorbent precursor or raw carbonaceous material is small, it would be more difficult to effect an efficient separation of the activated sorbent particles from the gas stream in the gas/solid separator 606. Accordingly, if this separation is not efficient, then a portion of the activated sorbent would be sent to the gas burner 623 where it would be combusted and wasted. Or, in the case where separation is simply not necessary because the particle size of the activated sorbent is already sufficiently small, then the gas stream containing carbon monoxide and volatile organics would be added back to the gas stream containing the gaseous pollutant or the flue gas, which is not desirable.

Optionally, the process shown in FIG. 6 may be used to add chemicals to the gas stream 621 comprising at least one gaseous pollutant to be removed. In this embodiment, certain chemicals can be added to the gas stream 621 with the gaseous pollutant to react with a given gaseous pollutant and convert it to a form that is more easily removed from the gas stream compared to its original form, for example, by using an activated sorbent. This optional addition of a chemical or mixture of chemicals to the gas stream 621 is similar to that described in connection with FIG. 2.

In one embodiment, the chemicals added to the gas stream 621 with the gaseous pollutant may include certain chemicals from which ions and gases are generated using a high temperature reaction. These ions and gases react with one or more gaseous pollutants in the gas stream 621 to alter its chemical composition to a form that allows it to be more easily removed from the gas stream 621.

As shown in FIG. 6, an optional chemical addition device 626 is used to add a chemical or mixture of chemicals to the gas burner 623 or upstream of the gas burner 623, which can serve as a high temperature reactor. For example, the gas burner 623 can be used to decompose bromine compounds, such as sodium and calcium bromide, into chemically reactive bromine ions and gases, such as bromine gas, elemental bromine, or hydrogen bromide. The required temperature of the gas stream into which the bromine compound is added should be high enough to achieve decomposition and in some embodiments will be in the range of about 300° C. to about 1700° C. These bromine ions and gases may be particularly useful in gas streams that contain elemental mercury, such as flue gas from a coal-fired boiler. The bromine ions and gases oxidize the elemental mercury to an oxidized form of mercury. The oxidized form of mercury can then be more easily removed from the gas stream, for example, with the use of an activated sorbent, including, for example, commercially available sorbents, sorbents produced on-site, and sorbents produced according to the methods described herein, such as activated sorbents produced with the addition of certain chemicals that enhance the activated sorbent's effectiveness as described above. Such an oxidized form of mercury could also be more easily removed from a flue gas stream through absorption in a wet $SO_x$ scrubber.

In other embodiments, the chemical added can be any halogen element or halogen-based compound, including, for example, chlorides, iodides, and fluorides. These halogens, including both halogens and halogen-based compounds, can be added in any of the ways described above for other chemicals, as halogens or halogen-based compounds may be added as their respective salts. In some embodiments, these halogens work in the same way as the bromides to oxidize elemental mercury to an oxidized form of mercury that can be more readily removed from the gas stream using activated carbon or by absorption in a wet $SO_x$ scrubber.

As noted above, removal of a given gaseous pollutant that has been converted to a form that is more easily removed can be done using an activated sorbent including, for example, commercially available sorbents, sorbents produced on-site, and sorbents produced according to the methods described herein. Accordingly, as shown in FIG. 6, the chemicals added to the gas burner 623 and any resulting ions and gases produced by increasing their temperature in the gas burner 623 are carried by the gas stream 624 exiting the gas burner 623 and added to the gas stream 621 with the gaseous pollutant at a given location 628 upstream of the addition location 622 where the activated sorbent is added to the gas stream 621. As described in connection with FIG. 2, the chemicals added to the gas burner 623 may be the same or different than the chemicals used, if any, in producing the activated sorbent by the activated sorbent production process 602.

Figure 7:
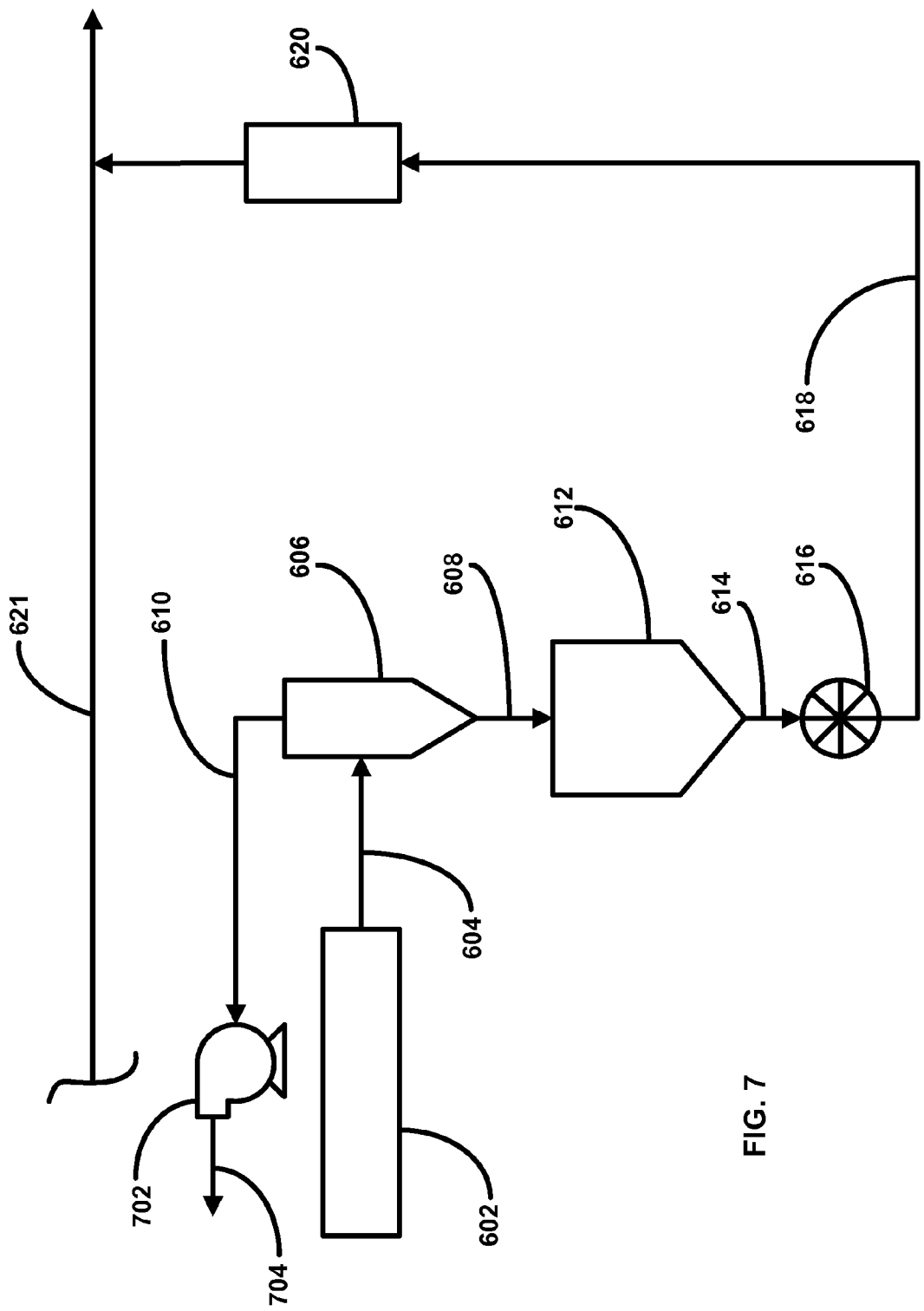
FIG. 7 illustrates a process flow diagram for separating a sorbent from an activating gas stream and adding the activated sorbent to a gas stream comprising at least one gaseous pollutant according to another embodiment of the invention.

FIG. 7 illustrates a process flow diagram for separating a sorbent from an activating gas stream and adding the activated sorbent to a gas stream comprising at least one gaseous pollutant according to another embodiment of the invention. The process shown in FIG. 7 is similar to that shown in FIG. 6 with the exception that the gas stream 610 exiting the gas/solid separator 606 is simply passed to a fan 702, such as a forced draft fan, that in turn passes the gas stream 610 back to a location upstream of the gas stream 621 comprising the at least one pollutant to be removed. In this embodiment, there is no gas burner or use of additional chemicals for addition to the gas stream 621 with the gaseous pollutant. In some embodiments, the gas stream 610 may be sent back to a combustion device, such as a coal-fired boiler, that produced the gas stream 621 with the gaseous pollutant to be removed. In this case, the fan 702 may be an existing fan that is used to supply air to the coal-fired boiler. In some embodiments, an additional fan (not shown) may be used to pass the gas stream 610 exiting the gas/solid separator 606 to the fan 702 that supplies air to the coal-fired boiler. This particular embodiment makes the return of the gas stream 610 exiting the gas/solid separator 606 to the boiler relatively simple since only a hole is needed in the fan ductwork through which the gas stream 610 can be added to the air passing through the fan, as opposed to having to create a hole in the boiler. Another advantage of this embodiment is that a gas burner, such as the gas burner 623 shown in FIG. 6, is not required, which reduces gas usage and costs. As discussed above in connection with FIG. 6, it should be appreciated, however, that inefficient separation of the activated sorbent from the gas stream in the gas/solid separator 606 will result in activated sorbent being sent with the gas stream exiting the gas/solid separator 606 back to the boiler. Accordingly, that activated sorbent will simply be burned in the boiler and wasted. Therefore, in some embodiments, it may be desirable to use a sorbent precursor or raw carbonaceous material with a relatively larger particle size to effect a more efficient separation of the activated sorbent in the gas/solid separator 606, again, as discussed above.

Figure 8:
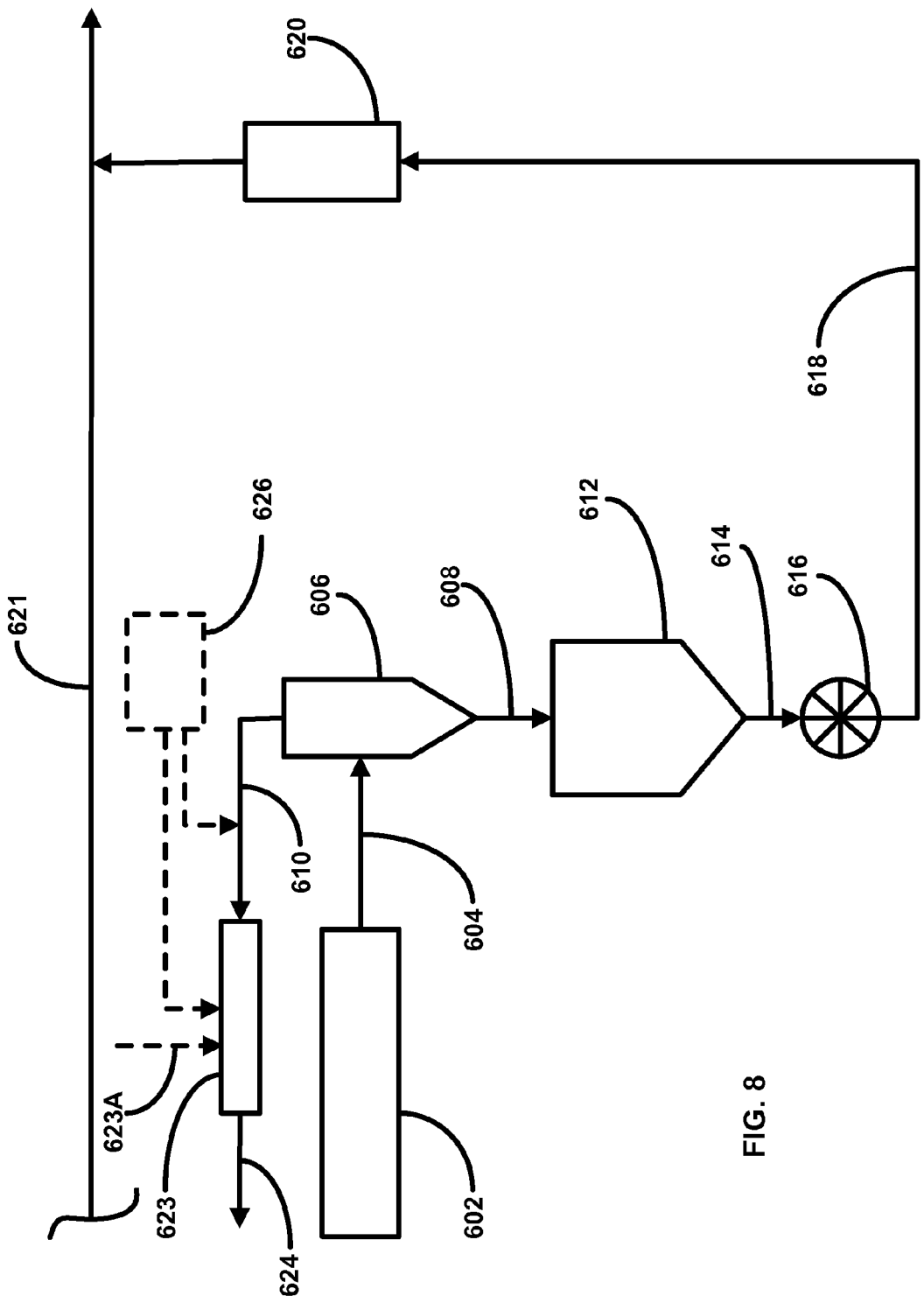
FIG. 8 illustrates a process flow diagram for separating a sorbent from an activating gas stream, adding the sorbent to a gas stream comprising at least one gaseous pollutant, and optionally adding a chemical, such as a halogen or halogen salt, to the separated activating gas stream for subsequent addition to one or more of a variety a locations in a combustion process according to one embodiment of the invention.

FIG. 8 illustrates a process flow diagram for separating a sorbent from an activating gas stream, adding the sorbent to a gas stream comprising at least one gaseous pollutant, and optionally adding a chemical, such as a halogen or halogen-based compound or salt, to the separated activating gas stream for subsequent addition to one or more of a variety a locations in a combustion process according to one embodiment of the invention. The process shown in FIG. 8 is similar to that shown in FIG. 6 with the exception that the gas stream exiting the gas burner 623 is directed to and added to any point in the overall combustion process, such as injection into the upstream combustion device, such as a coal-fired boiler, injection in a flue gas duct downstream of the combustion device, injection upstream of an air-preheater, or in any gas duct location in the overall process. Accordingly, operation of the gas burner as described in connection with FIG. 6, including, for example, the addition of an oxidant or air to the gas burner for purposes of burning carbon monoxide and volatile organics, applies here as well.

Also, similar to FIG. 6, the process in FIG. 8 provides for the optional use of chemical addition to a gas burner 623 as described in connection with FIG. 6. Accordingly, any of the chemicals described above in connection with FIG. 6 may be used, and processing may be the same as that described in connection with FIG. 6. The use of such chemicals may affect where the gas stream 624 exiting the burner 623 is added back to the combustion process.

Figure 9:
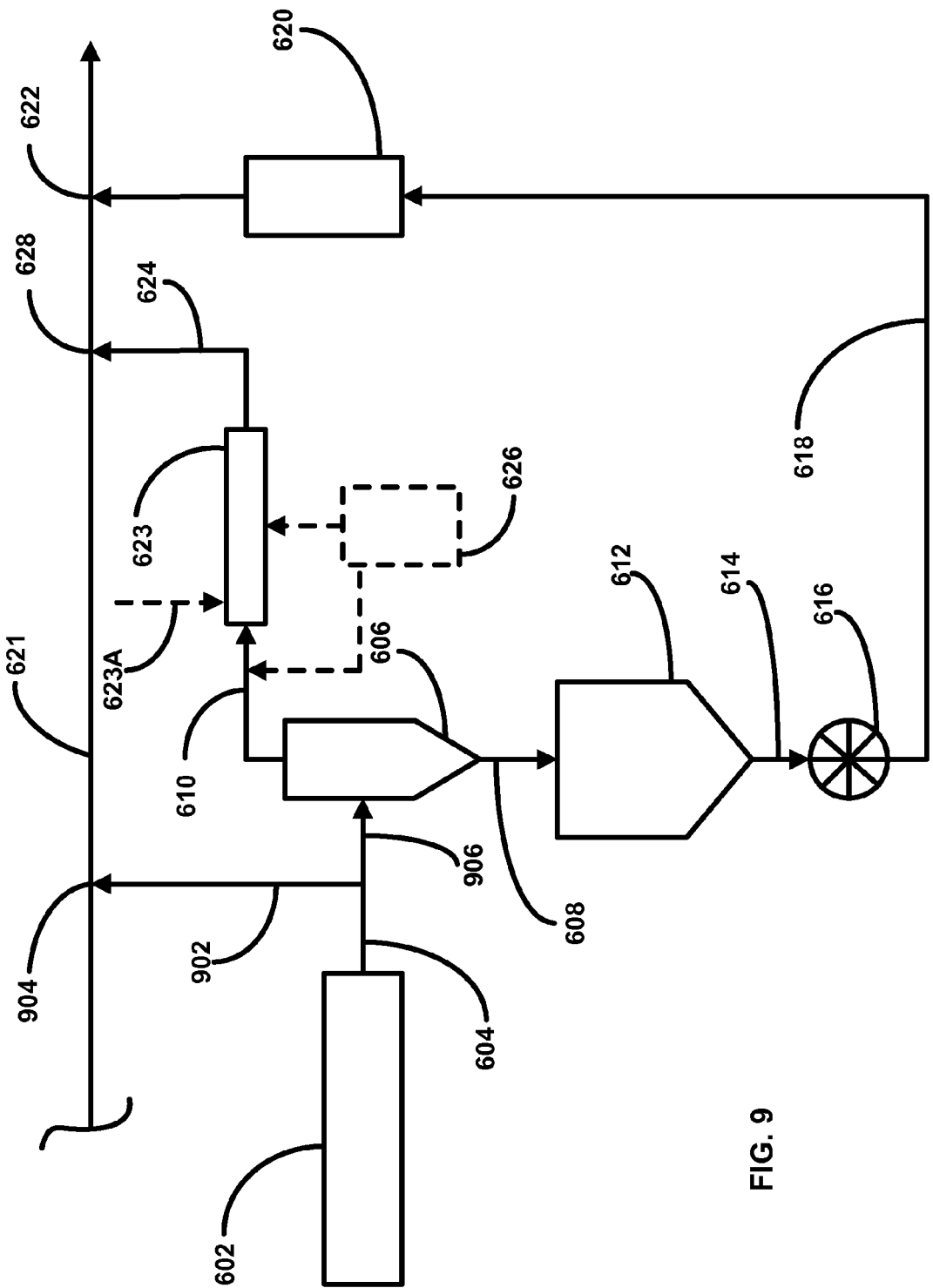
FIG. 9 illustrates a process flow diagram for adding a first portion of an activating gas stream comprising a sorbent having an enhanced effectiveness to a gas stream comprising at least one gaseous pollutant and for separating a second portion of the activating gas stream comprising the sorbent into a stream of solid sorbent and the remaining activating gas stream and adding the sorbent and optionally a chemical, such as a halogen or halogen salt, to the gas stream comprising at least one gaseous pollutant according to one embodiment of the invention.

FIG. 9 illustrates a process flow diagram for adding a first portion of an activating gas stream comprising a sorbent having an enhanced effectiveness to a gas stream comprising at least one gaseous pollutant and for separating a second portion of the activating gas stream comprising the sorbent into a stream of solid sorbent and the remaining activating gas stream and adding the sorbent and optionally a chemical, such as a halogen or halogen salt, to the gas stream comprising at least one gaseous pollutant according to one embodiment of the invention. The process shown in FIG. 9 is basically the same as that shown in FIG. 6 with the exception that a portion 902 of the gas stream 604 exiting the activated sorbent production process 602 is separated and added directly to the gas stream 621 with the gaseous pollutant at a given addition location 904. Accordingly, the remaining portion 906 of the gas stream 604 exiting the activated sorbent production process 602 is passed to the gas/solid separator 606 and processed in the same manner as described in connection with FIG. 6. Therefore, in this embodiment, activated sorbent is actually added to the gas stream 621 with the gaseous pollutant at two addition locations 622, 904. Of course, the exact addition locations 622, 904 may be varied and even switched such that the portion of the gas stream 604 exiting the activated sorbent production process 602 that is added directly to the gas stream 621 with the gaseous pollutant may be added at an addition location downstream of the addition location where the activated sorbent particle stream 618 is added using the sorbent addition device 620. It should be appreciated that operation of the gas burner as described in connection with FIG. 6, including, for example, the addition of an oxidant or air to the gas burner for purposes of burning carbon monoxide and volatile organics, applies here as well.

Also, similar to FIG. 6, the process in FIG. 9 provides for the optional use of chemical addition to a gas burner 623 as described in connection with FIG. 6. Accordingly, any of the chemicals described above in connection with FIG. 6 may be used, and processing may be the same as that described in connection with FIG. 6.

Figure 10:
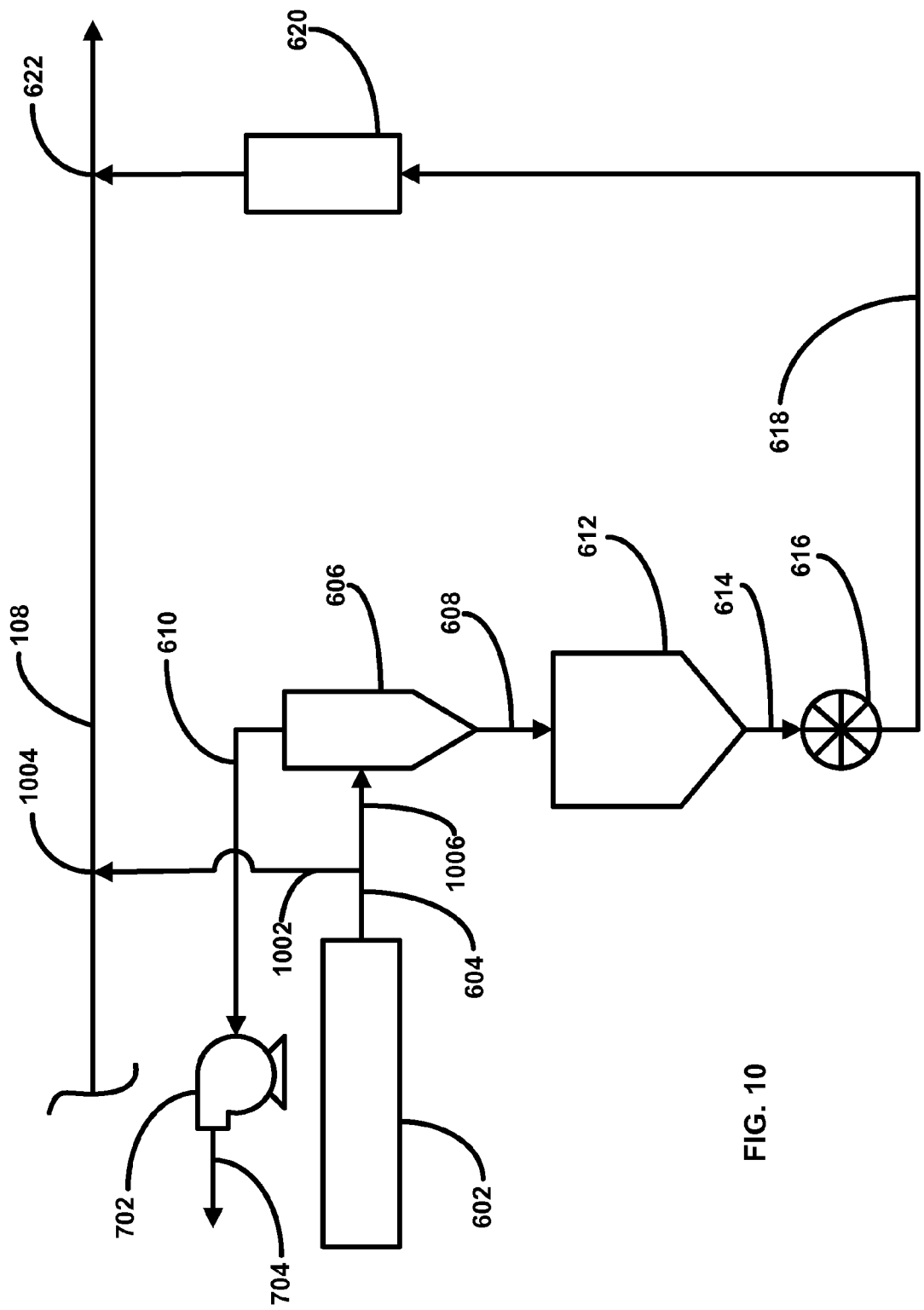
FIG. 10 illustrates a process flow diagram for adding a first portion of an activating gas stream comprising a sorbent having an enhanced effectiveness to a gas stream comprising at least one gaseous pollutant and for separating a second portion of the activating gas stream comprising the sorbent into a stream of solid sorbent and the remaining activating gas stream and adding the activated sorbent to the gas stream comprising at least one gaseous pollutant according to another embodiment of the invention.

FIG. 10 illustrates a process flow diagram for adding a first portion of an activating gas stream comprising a sorbent having an enhanced effectiveness to a gas stream comprising at least one gaseous pollutant and for separating a second portion of the activating gas stream comprising the sorbent into a stream of solid sorbent and the remaining activating gas stream and adding the activated sorbent to the gas stream comprising at least one gaseous pollutant according to another embodiment of the invention. The process shown in FIG. 10 is similar to that shown in FIG. 7 with the exception that, in a manner similar to FIG. 9, a portion 1002 of the gas stream 604 exiting the activated sorbent production process 602 is separated and added directly to the gas stream 621 with the gaseous pollutant at an addition location 1004. Accordingly, the remaining portion 1006 of the gas stream 604 exiting the activated sorbent production process 602 is passed to the gas/solid separator 606 and processed in the same manner as described in connection with FIG. 6. Therefore, in this embodiment, activated sorbent is actually added to the gas stream 621 with the gaseous pollutant at two addition locations 622, 1004. Of course, the exact addition locations 622, 1004 may be varied and even switched such that the portion of the gas stream 604 exiting the activated sorbent production process 602 that is added directly to the gas stream 621 with the gaseous pollutant may be added at an addition location downstream of the addition location where the activated sorbent particle stream 618 is added using the sorbent addition device 620.

Figure 11:
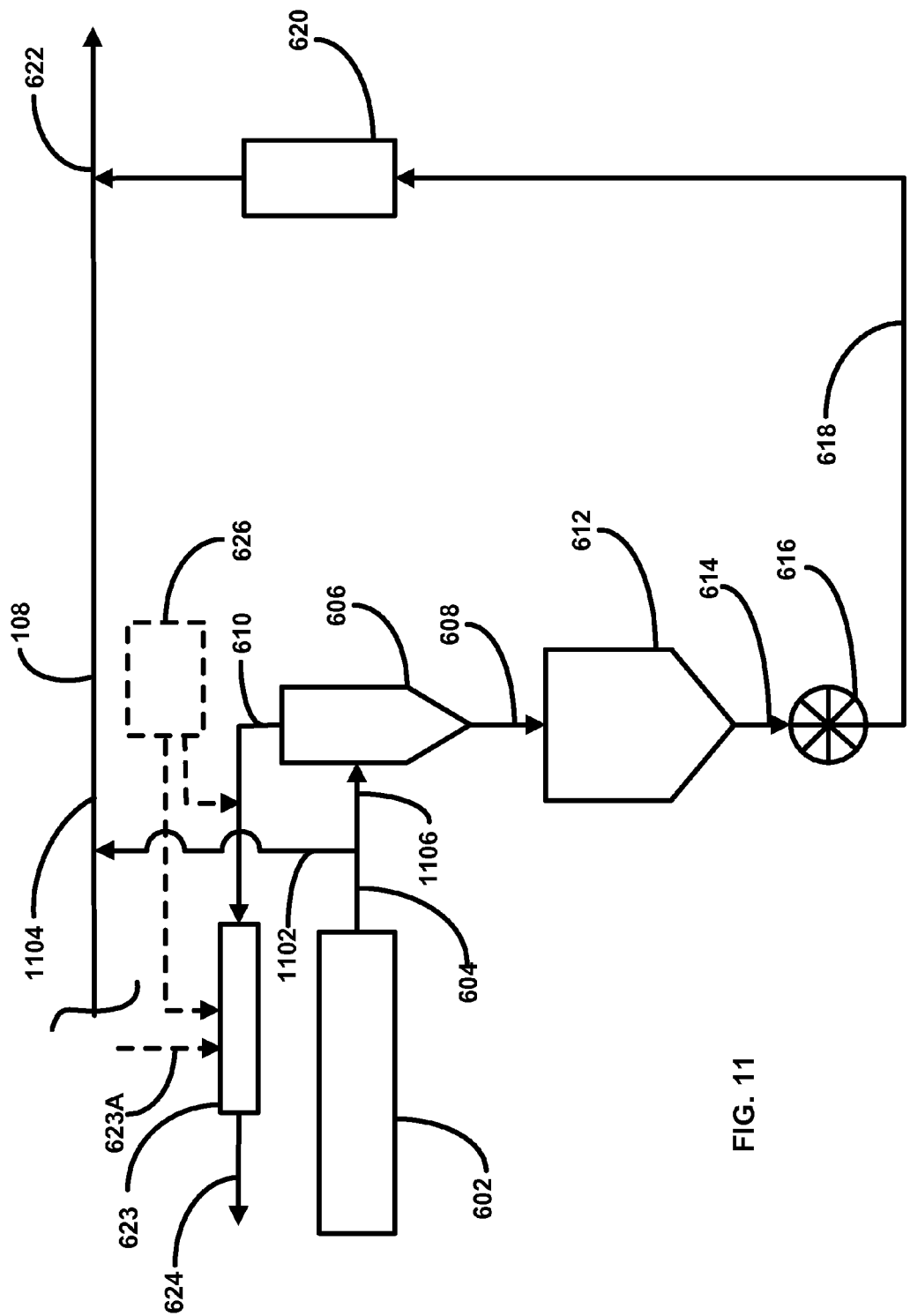
FIG. 11 illustrates a process flow diagram for adding a first portion of an activating gas stream comprising a sorbent having an enhanced effectiveness to a gas stream comprising at least one gaseous pollutant and for separating a second portion of the activating gas stream comprising the sorbent into a stream of solid sorbent and the remaining activating gas stream, adding the sorbent to a gas stream comprising at least one gaseous pollutant, and optionally adding a chemical, such as a halogen or halogen salt, to the separated activating gas stream for subsequent addition to one or more of a variety a locations in a combustion process according to one embodiment of the invention.

FIG. 11 illustrates a process flow diagram for adding a first portion of an activating gas stream comprising a sorbent having an enhanced effectiveness to a gas stream comprising at least one gaseous pollutant and for separating a second portion of the activating gas stream comprising the sorbent into a stream of solid sorbent and the remaining activating gas stream, adding the sorbent to a gas stream comprising at least one gaseous pollutant, and optionally adding a chemical, such as a halogen or halogen salt, to the separated activating gas stream for subsequent addition to one or more of a variety a locations in a combustion process according to one embodiment of the invention. The process shown in FIG. 11 is similar to that shown in FIG. 8 with the exception that, in a manner similar to FIG. 9, a portion 1102 of the gas stream 604 exiting the activated sorbent production process 602 is separated and added directly to the gas stream 621 with the gaseous pollutant at an addition location 1104. Accordingly, the remaining portion 1106 of the gas stream 604 exiting the activated sorbent production process 602 is passed to the gas/solid separator 606 and processed in the same manner as described in connection with FIG. 8. Therefore, in this embodiment, activated sorbent is actually added to the gas stream 621 with the gaseous pollutant at two addition locations 622, 1104. Of course, the exact addition locations 622, 1004 may be varied and even switched such that the portion of the gas stream 604 exiting the activated sorbent production process 602 that is added directly to the gas stream 621 with the gaseous pollutant may be added at an addition location downstream of the addition location where the activated sorbent particle stream 618 is added using the sorbent addition device 620. It should be appreciated that operation of the gas burner as described in connection with FIG. 6, including, for example, the addition of an oxidant or air to the gas burner for purposes of burning carbon monoxide and volatile organics, applies here as well.

Also, similar to FIGS. 6 and 8, the process in FIG. 11 provides for the optional use of chemical addition to a gas burner 623 as described in connection with FIG. 6. Accordingly, any of the chemicals described above in connection with FIG. 6 may be used, and processing may be the same as that described in connection with FIG. 6. The use of such chemicals may affect where the gas stream 624 exiting the burner 623 is added back to the combustion process.

Although the foregoing invention has been described in some detail to facilitate understanding, as noted above, it will be apparent that certain changes and modifications may be practiced within the scope of the appended claims. Accordingly, the described embodiment is to be considered as illustrative and not restrictive. For example, although certain embodiments have been described in connection with a coal-fired boiler or a flue gas from a coal-fired boiler, the methods and equipment described herein may be used in connection with other gas streams. Similarly, although certain embodiments have been described in connection with the removal of mercury as the gaseous pollutant or contaminant in a given gas stream, the methods and equipment described herein may be used in connection with the removal of other gaseous pollutants. Further, although certain embodiments have been described in connection with the use of a raw carbonaceous material as the sorbent precursor and the production of activated carbon, other sorbent precursors can be used to produce other activated sorbent.

Further still, it should be appreciated that the foregoing embodiments illustrated in FIGS. 6-11 may be used in connection with a gas stream that comprises more than one gaseous pollutant. Therefore, it should be appreciated that more than one activated sorbent may be used. For example, one activated sorbent may be used for removing a given gaseous pollutant and a chemically or physically different activated sorbent may be used to remove a different gaseous pollutant from the same gas stream. Furthermore, it should be appreciated, as described in connection with FIG. 6, that the activated sorbent production process shown in FIGS. 6-11 refers to the production of an activated sorbent and may include the production of a chemically-enhanced activated sorbent as described above in connection with FIGS. 2-5. It should also be appreciated that the gas stream with one or more gaseous pollutants may be any gas stream having a gaseous pollutant or a vapor phase contaminant. In some embodiments, this gas stream is a flue gas stream produced by a combustion device, such as a coal-fired boiler.

What is claimed is:

1. A method for adding an activated sorbent to a gas stream comprising at least one gaseous pollutant, comprising:
separating a first gas stream comprising an activated sorbent into a stream of said activated sorbent and a separated gas stream, wherein said first gas stream comprises a gas stream used to activate a sorbent precursor to produce said activated sorbent;
adding said activated sorbent from said stream of said activated sorbent to a second gas stream comprising at least one gaseous pollutant, wherein said activated sorbent is capable of adsorbing said at least one gaseous pollutant;
adding an oxidant to said separated gas stream;
oxidizing carbon monoxide in said separated gas stream; and
adding, after said oxidizing, said separated gas stream to said second stream.

2. The method of claim 1, wherein said oxidizing further comprises oxidizing volatile organic compounds in said separated gas stream and wherein said oxidizing is performed using a gas burner.

3. The method of claim 1, wherein said adding said activated sorbent to said second gas stream comprises adding said activated sorbent to said second gas stream at a first location and wherein said adding said separated gas stream to said second gas stream comprises adding said separated gas stream to said second gas stream at a second location upstream of said first location.

4. The method of claim 1, further comprising:
adding a halogen or a halogen compound to said separated gas stream.

5. The method of claim 4, wherein said adding said halogen or said halogen compound to said separated gas stream comprises adding said halogen or said halogen compound to said separated gas before or during said oxidizing.

6. The method of claim 5, wherein said adding said activated sorbent to said second gas stream comprises adding said activated sorbent to said second gas stream at a first location and wherein said adding said separated gas stream to said second gas stream comprises adding said separated gas stream to said second gas stream at a second location upstream of said first location.

7. A method for adding an activated sorbent to a gas stream comprising at least one gaseous pollutant, comprising:
separating a first gas stream comprising an activated sorbent into a stream of said activated sorbent and a separated gas stream, wherein said first gas stream comprises a gas stream used to activate a sorbent precursor to produce said activated sorbent;
adding said activated sorbent from said stream of said activated sorbent to a second gas stream comprising at least one gaseous pollutant, wherein said activated sorbent is capable of adsorbing said at least one gaseous pollutant;
adding an oxidant to said separated gas stream;
oxidizing carbon monoxide in said separated gas stream; and
adding, after said oxidizing, said separated gas stream to a third gas stream located upstream of said first location or to said flue gas stream.

8. The method of claim 7, wherein said oxidizing further comprises oxidizing volatile organic compounds in said separated gas stream and wherein said oxidizing is performed using a gas burner.

9. The method of claim 7, further comprising:
adding a halogen or a halogen compound to said separated gas stream before or during said oxidizing.

10. The method of claim 9, wherein said adding said separated gas stream to a third gas stream comprises adding said separated gas stream to said combustion device.

11. The method of claim 9, wherein said adding said separated gas stream to a third gas stream comprises adding said separated gas stream to an air preheater located upstream of said combustion device.

12. The method of claim 9, wherein said adding said activated sorbent to said second gas stream comprises adding said activated sorbent to said second gas stream at a first location and wherein said adding said separated gas stream to said flue gas comprises adding said separated gas stream to said flue gas at a second location upstream of said first location.

13. A method for adding an activated sorbent to a gas stream comprising at least one gaseous pollutant, comprising:
separating a first gas stream comprising an activated sorbent into a first portion and a second portion wherein said first gas stream comprises an activating gas stream used to activate a sorbent precursor to produce said activated sorbent and wherein said activated sorbent is capable of adsorbing at least one gaseous pollutant and wherein each of said first and second portions comprise a part of said activating gas stream and said activated sorbent;
adding said first portion of said first gas stream to a gas stream comprising said at least one gaseous pollutant;
separating said second portion of said first gas stream into a stream of said activated sorbent and a separated gas stream; and
adding said activated sorbent from said stream of said activated sorbent to a gas stream comprising said at least one gaseous pollutant.

14. The method of claim 13, further comprising:
adding a sorbent precursor to said activating gas stream;
adding a chemical to said activating gas stream; and
activating said sorbent precursor in said activating gas stream in the presence of said chemical to produce said first gas stream and said activated sorbent, wherein said activated sorbent provides increased adsorption of said at least one gaseous pollutant compared to a same activated sorbent produced in the absence of said chemical.

15. The method of claim 13, further comprising:
adding an oxidant to said separated gas stream;
oxidizing carbon monoxide in said separated gas stream; and
adding, after said oxidizing, said separated gas stream to said gas stream comprising said at least one gaseous pollutant.

16. The method of claim 15, wherein said oxidizing further comprises oxidizing volatile organic compounds in said separated gas stream and wherein said oxidizing is performed using a gas burner.

17. The method of claim 15, wherein said adding said activated sorbent to said gas stream comprising said at least one gaseous pollutant comprises adding said activated sorbent to said gas stream comprising said at least one gaseous pollutant at a first location and wherein said adding said separated gas stream to said gas stream comprising said at least one gaseous pollutant comprises adding said separated gas stream to said gas stream comprising said at least one gaseous pollutant at a second location upstream of said first location.

18. The method of claim 13, further comprising:
adding a halogen or a halogen compound to said separated gas stream.

19. The method of claim 18, wherein said adding said halogen or said halogen compound to said separated gas stream comprises adding said halogen or said halogen compound to said separated gas before or during said oxidizing.

20. The method of claim 19, wherein said adding said activated sorbent to said gas stream comprising said at least one gaseous pollutant comprises adding said activated sorbent to said gas stream comprising said at least one gaseous pollutant at a first location and wherein said adding said separated gas stream to said gas stream comprising said at least one gaseous pollutant comprises adding said separated gas stream to said gas stream comprising said at least one gaseous pollutant at a second location upstream of said first location.

21. The method of claim 13, wherein said gas stream comprising said at least one gaseous pollutant comprises a flue gas stream produced by a combustion device and further comprising:
adding said separated gas stream to said combustion device.

22. The method of claim 13, wherein said gas stream comprising said at least one gaseous pollutant comprises a flue gas stream produced by a combustion device that exits said combustion device at a first location and further comprising:
adding an oxidant to said separated gas stream;
oxidizing carbon monoxide in said separated gas stream; and
adding, after said oxidizing, said separated gas stream to a second gas stream located upstream of said first location or to said flue gas.

23. The method of claim 22, wherein said oxidizing further comprises oxidizing volatile organic compounds in said separated gas stream and wherein said oxidizing is performed using a gas burner.

24. The method of claim 22, further comprising:
adding a halogen or a halogen compound to said separated gas stream before or during said oxidizing.

25. The method of claim 24, wherein said adding said separated gas stream to a second gas stream comprises adding said separated gas stream to said combustion device.

26. The method of claim 24, wherein said adding said separated gas stream to a second gas stream comprises adding said separated gas stream to an air preheater located upstream of said combustion device.

27. The method of claim 24, wherein said adding said activated sorbent to said gas stream comprising said at least one gaseous pollutant comprises adding said activated sorbent to said gas stream comprising said at least one gaseous pollutant at a first location and wherein said adding said separated gas stream to said flue gas comprises adding said separated gas stream to said flue gas at a second location upstream of said first location.

28. The method of claim 13, further comprising:
collecting said stream of said activated sorbent to produce collected activated sorbent; and
pulverizing said collected activated sorbent before said adding of said activated sorbent to said gas stream comprising said at least one gaseous pollutant.

* * * * *